(12) United States Patent
Kohno et al.

(10) Patent No.: US 7,382,548 B2
(45) Date of Patent: Jun. 3, 2008

(54) VARIABLE MAGNIFICATION OPTICAL SYSTEM

(75) Inventors: Tetsuo Kohno, Suita (JP); Genta Yagyu, Nishinomiya (JP); Shinji Yamaguchi, Osaka (JP)

(73) Assignee: Konica Minolta Photo Imaging, Inc., Tokyo (JP)

( * ) Notice: Subject to any disclaimer, the term of this patent is extended or adjusted under 35 U.S.C. 154(b) by 0 days.

(21) Appl. No.: 11/248,546

(22) Filed: Oct. 12, 2005

(65) Prior Publication Data
US 2007/0014031 A1  Jan. 18, 2007

(30) Foreign Application Priority Data
Jul. 14, 2005 (JP) .............................. 2005-205545

(51) Int. Cl.
  G02B 15/14 (2006.01)
  G02B 17/00 (2006.01)
(52) U.S. Cl. ...................................... 359/686; 359/734
(58) Field of Classification Search ........ 359/686–688, 359/734, 726
See application file for complete search history.

(56) References Cited

U.S. PATENT DOCUMENTS 6,002,526 A * 12/1999 Okada et al. ............... 359/677

FOREIGN PATENT DOCUMENTS

| JP | 07-168096 A | 7/1995 |
|---|---|---|
| JP | 08-248318 A | 9/1996 |
| JP | 09-138347 A | 5/1997 |
| JP | 10-020191 A | 1/1998 |
| JP | 2000-187159 A | 7/2000 |
| JP | 2000-187160 A | 7/2000 |
| JP | 2002-169088 A | 6/2002 |
| JP | 2003-202500 A | 7/2003 |
| JP | 2004-102089 A | 4/2004 |

* cited by examiner

Primary Examiner—William C Choi
(74) Attorney, Agent, or Firm—Sidley Austin LLP

(57) ABSTRACT

A variable magnification optical system of the present invention for forming an optical image of an object on a light-receiving surface of an image sensor with variable magnification includes: from the object side, at least a first lens unit having a positive optical power, a second lens unit having a negative optical power, a third lens unit having a positive optical power, and a fourth lens unit having a positive optical power. The variable magnification is performed by movement of at least the first lens unit and the third lens unit. A bending optical element for bending an optical axis is provided between the second lens unit and the third lens unit. Moreover, prescribed conditional formulae are fulfilled.

6 Claims, 12 Drawing Sheets

FNO=3.60

(W)
— d
---- SC

-0.1   0.1
SPHERICAL  SINE
ABERRATION CONDITION

Y'=4.5

---- DM
— DS

-0.1   0.1
ASTIGMATISM

Y'=4.5

-5.0   5.0
DISTORTION %

FNO=3.96

(M)
— d
---- SC

-0.1   0.1
SPHERICAL  SINE
ABERRATION CONDITION

Y'=4.5

---- DM
— DS

-0.1   0.1
ASTIGMATISM

Y'=4.5

-5.0   5.0
DISTORTION %

FNO=5.60

(T)
— d
---- SC

-0.1   0.1
SPHERICAL  SINE
ABERRATION CONDITION

Y'=4.5

---- DM
— DS

-0.1   0.1
ASTIGMATISM

Y'=4.5

-5.0   5.0
DISTORTION %

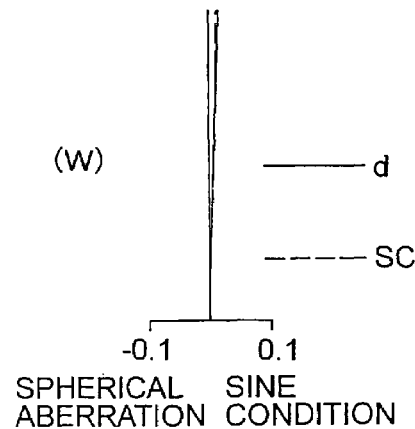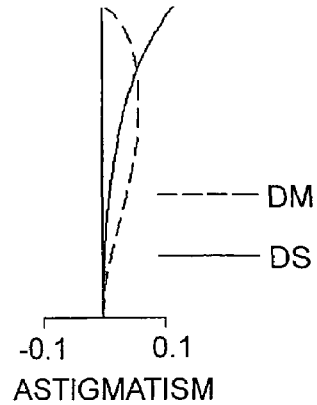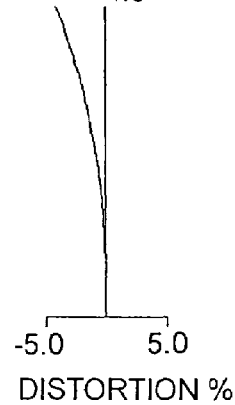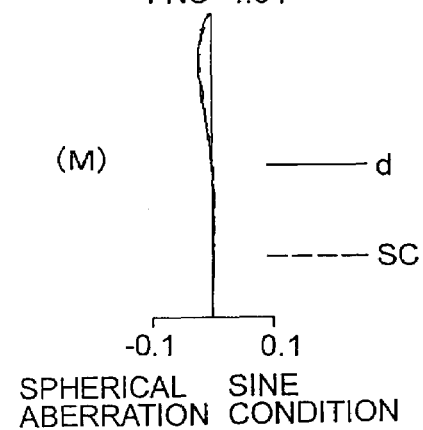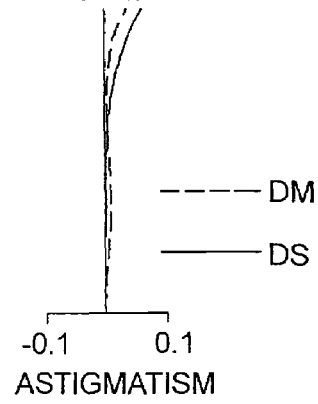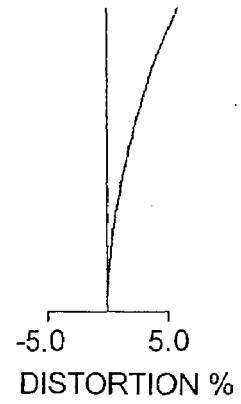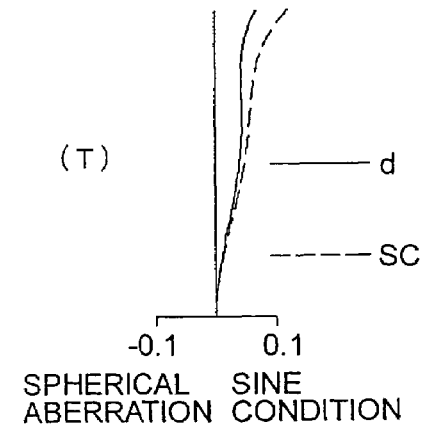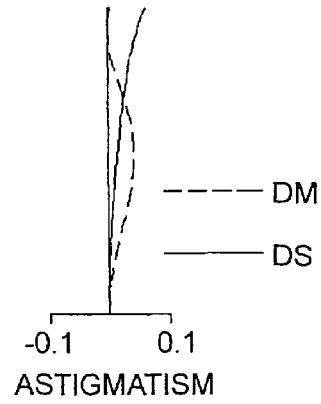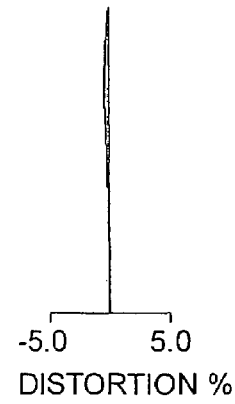

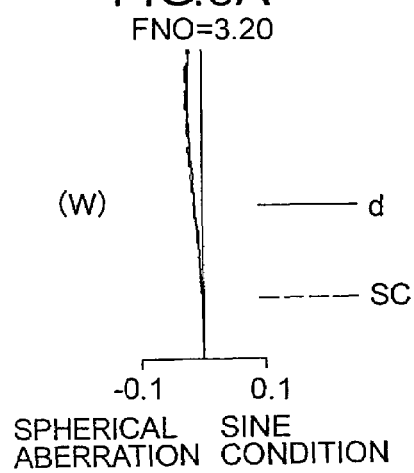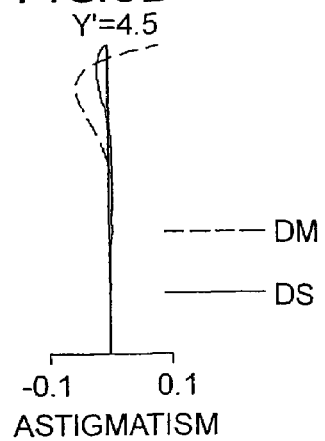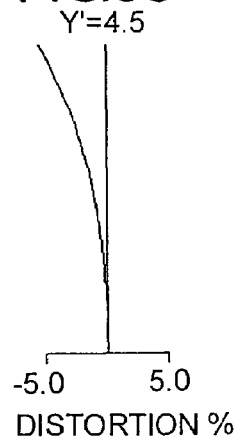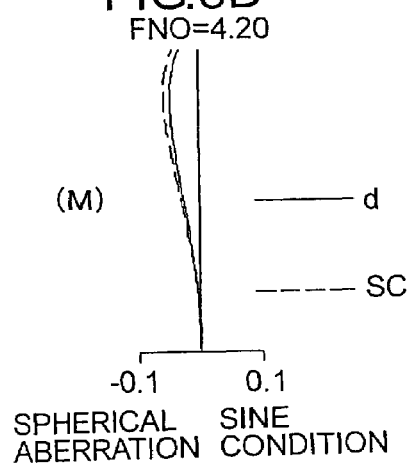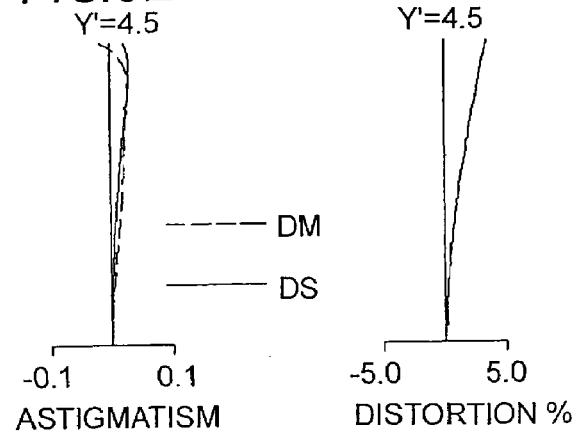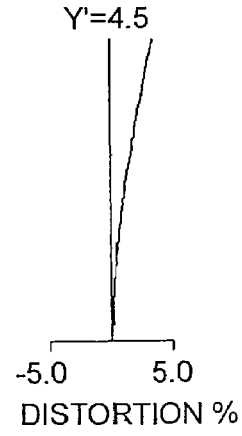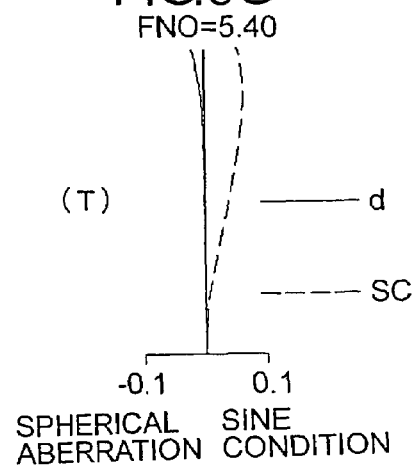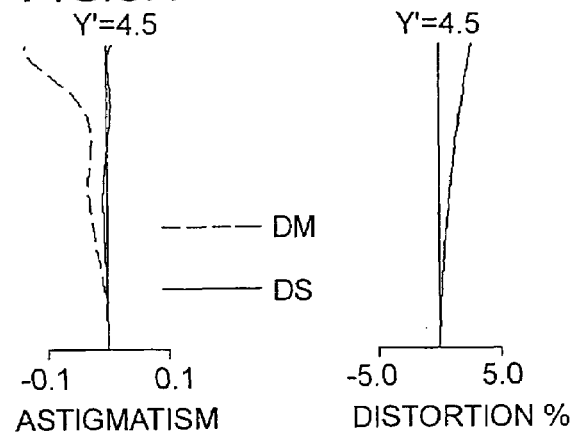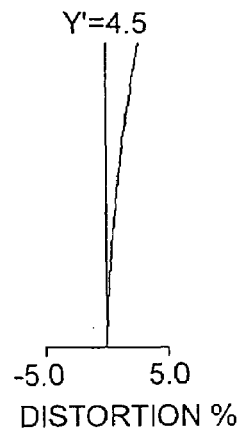

FNO=3.40
(W)
— d
---- SC
-0.1   0.1
SPHERICAL SINE
ABERRATION CONDITION

Y'=4.5
---- DM
— DS
-0.1   0.1
ASTIGMATISM

Y'=4.5
-5.0   5.0
DISTORTION %

FNO=4.40
(M)
— d
---- SC
-0.1   0.1
SPHERICAL SINE
ABERRATION CONDITION

Y'=4.5
---- DM
— DS
-0.1   0.1
ASTIGMATISM

Y'=4.5
-5.0   5.0
DISTORTION %

FNO=5.50
(T)
— d
---- SC
-0.1   0.1
SPHERICAL SINE
ABERRATION CONDITION

Y'=4.5
---- DM
— DS
-0.1   0.1
ASTIGMATISM

Y'=4.5
-5.0   5.0
DISTORTION %

FNO=3.60

(W)
— d
---- SC

-0.1  0.1
SPHERICAL SINE
ABERRATION CONDITION

Y'=4.5

---- DM
— DS

-0.1  0.1
ASTIGMATISM

Y'=4.5

-5.0  5.0
DISTORTION %

FNO=4.19

(M)
— d
---- SC

-0.1  0.1
SPHERICAL SINE
ABERRATION CONDITION

Y'=4.5

---- DM
— DS

-0.1  0.1
ASTIGMATISM

Y'=4.5

-5.0  5.0
DISTORTION %

FNO=5.60

(T)
— d
---- SC

-0.1  0.1
SPHERICAL SINE
ABERRATION CONDITION

Y'=4.5

---- DM
— DS

-0.1  0.1
ASTIGMATISM

Y'=4.5

-5.0  5.0
DISTORTION %

VARIABLE MAGNIFICATION OPTICAL SYSTEM

This application is based on Japanese Patent Application No. 2005-205545 filed on Jul. 14, 2005, the contents of which are hereby incorporated by reference.

BACKGROUND OF THE INVENTION

1. Field of the Invention

The present invention relates to a variable magnification optical system. More particularly, the present invention relates to a variable magnification optical system (especially a compact zoom lens system that offers high magnification variation) suitable for, for example, a digital camera and a digital appliance equipped with an image capturing capability that capture an image of a subject with an image sensor, and to an image-taking apparatus provided therewith.

2. Description of Related Art

Due to recent widespread use of digital cameras, silver salt cameras seem to have been replaced with these digital cameras. Following the widespread use of digital cameras, there has been a demand for an even more compact digital camera and also a demand for an even more compact image-taking lens system. In response to such a demand, there has been introduced into the market a digital camera whose camera thickness is greatly reduced by using in an image-taking lens system a bending optical element, such as a prism, mirror, or the like, which bends an optical path. The feature of the digital camera of this type, which is not possessed by a sliver salt camera, is effectively utilized to achieve the slimming down of the digital camera. More specifically, the digital camera has a high degree of freedom in its arrangement of an image sensor (for example, a photoelectric converting element) in the camera. This digital camera also permits an image inverted in the image-taking lens system to be easily restored through electrical processing. Therefore, bending an optical path by the bending optical element is a method of reducing the camera thickness, which method is particularly achieved by the digital camera.

Patent documents 1 to 9 and the like disclose zoom lens systems each having a bending optical element provided for the purpose of reducing the camera thickness. The zoom lens systems disclosed in patent documents 1 to 3 each have a bending optical element arranged in a first lens unit. The zoom lens system disclosed in patent document 4 has a bending optical element arranged in a second lens unit. The zoom lens systems disclosed in patent documents 5 and 6 each have a bending optical element arranged between a second lens unit and a third lens unit. The zoom lens system disclosed in the seventh embodiment has a bending optical element in a third lens unit. The zoom lens systems disclosed in the eighth and ninth embodiments each have a bending optical element between a third lens unit and a fourth lens unit.

[Patent document 1] Japanese Patent Application Laid-open No. H8-248318
[Patent document 2] Japanese Patent Application Laid-open No. H9-138347
[Patent document 3] Japanese Patent Application Laid-open No. 2003-202500
[Patent document 4] Japanese Patent Application Laid-open No. 2004-102089
[Patent document 5] Japanese Patent Application Laid-open No. 2000-187159
[Patent document 6] Japanese Patent Application Laid-open No. 2000-187160
[Patent document 7] Japanese Patent Application Laid-open No. 2002-169088
[Patent document 8] Japanese Patent Application Laid-open No. H7-168096
[Patent document 9] Japanese Patent Application Laid-open No. H10-20191

With an image sensor for use in a digital camera, the number of pixels has been increasing due to finer pixel pitch. Therefore, an image-taking lens system is demanded to have a high optical performance to catch up with the increase in the number of pixels in the image sensor. At the same time, the image-taking lens system is demanded to have a higher magnification variation ratio. However, it id difficult to ensure an optical performance to satisfy such high-standard specifications. Thus, aiming at ensuring a high optical performance inevitably results in upsizing of the image-taking lens system. Therefore, it is difficult for the conventional zoom lens systems disclosed in patent documents 1 to 9 to simultaneously meet mutually contradicting demands for higher magnification variation, a higher performance, and a more compact size.

SUMMARY OF THE INVENTION

In view of the problem described above, the present invention has been made, and it is an object of the invention to provide a variable magnification optical system that is compact in size and provides a high performance while providing a high magnification variation ratio, and to provide an image-taking apparatus provided therewith.

To achieve the object described above, according to one aspect of the invention, a variable magnification optical system for forming an optical image of an object on a light-receiving surface of an image sensor with variable magnification includes: from the object side, at least a first lens unit having a positive optical power, a second lens unit having a negative optical power, a third lens unit having a positive optical power, and a fourth lens unit having a positive optical power. The variable magnification is performed by movement of at least the first lens unit and the third lens unit. A bending optical element for bending an optical axis is provided between the second lens unit and the third lens unit. Conditional formulae (11), (12), and (13) below are fulfilled:

$$0.2 < \phi 3/\phi W < 1.0 \tag{11}$$

$$1.5 < \phi 3/\phi T < 10.0 \tag{12}$$

$$-2.0 < M4/M3 < 2.0 \tag{13}$$

where
- $\phi 3$ represents the optical power of the third lens unit,
- $\phi W$ represents the optical power of the entire system at the wide-angle end,
- $\phi T$ represents the optical power of the entire system at the telephoto end,
- M3 represents the amount of relative movement of the third lens unit in variable magnification from the wide-angle end to the telephoto end, with movement toward the object side being defined as positive, and
- M4 represents the amount of relative movement of the fourth lens unit in variable magnification from the wide-angle end to the telephoto end, with movement toward the object side being defined as positive.

According to another aspect of the invention, a variable magnification optical system for forming an optical image of an object on a light-receiving surface of an image sensor with variable magnification has at least four lens units, namely, from the object side, a first lens unit, a second lens unit, a third lens unit, and a fourth lens unit, at least two of which move to perform the variable magnification. The first lens unit has at least one negative lens element and at least one positive lens element. The second lens unit has at least one negative lens element and at least one positive lens element. A bending optical element for bending an optical axis is provided between the second lens unit and the third lens unit. Conditional formulae (11), (12), and (13) below are fulfilled:

$$0.2 < \phi 3/\phi W < 1.0 \quad (11)$$

$$1.5 < \phi 3/\phi T < 10.0 \quad (12)$$

$$-2.0 < M4/M3 < 2.0 \quad (13)$$

where
- φ3 represents the optical power of the third lens unit,
- φW represents the optical power of the entire system at the wide-angle end,
- φT represents the optical power of the entire system at the telephoto end,
- M3 represents the amount of relative movement of the third lens unit in variable magnification from a wide-angle end to a telephoto end, with movement toward the object side being defined as positive, and
- M4 represents the amount of relative movement of the fourth lens unit in variable magnification from the wide-angle end to the telephoto end, with movement toward the object According to still another aspect of the invention, an image-taking apparatus having a variable magnification optical system for forming an optical image of an object with variable magnification and an image sensor for converting the optical image into an electrical signal. The variable magnification optical system includes: from the object side, at least a first lens unit having a positive optical power, a second lens unit having a negative optical power, a third lens unit having a positive optical power, and a fourth lens unit having a positive optical power. The variable magnification is performed by movement of at least the first lens unit and the third lens unit. A bending optical element for bending an optical axis is provided between the second lens unit and the third lens unit. Conditional formulae (11), (12), and (13) below are fulfilled:

$$0.2 < \phi 3/\phi W < 1.0 \quad (1)$$

$$1.5 < \phi 3/\phi T < 10.0 \quad (12)$$

$$-2.0 < M4/M3 < 2.0 \quad (13)$$

where
- φ3 represents the optical power of the third lens unit,
- φW represents the optical power of the entire system at the wide-angle end,
- φT represents the optical power of the entire system at the telephoto end,
- M3 represents the amount of relative movement of the third lens unit in variable magnification from the wide-angle end to the telephoto end, with movement toward the object side being defined as positive, and
- M4 represents the amount of relative movement of the fourth lens unit in variable magnification from the wide-angle end to the telephoto end, with movement toward the object side being defined as positive.

According to still another aspect of the invention, an image-taking apparatus having a variable magnification optical system for forming an optical image of an object with variable magnification and an image sensor for converting the optical image into an electrical signal, has at least four lens units, namely, from the object side, a first lens unit, a second lens unit, a third lens unit, and a fourth lens unit, at least two of which move to perform the variable magnification. The first lens unit has at least one negative lens element and at least one positive lens element. The second lens unit has at least one negative lens element and at least one positive lens element. A bending optical element for bending an optical axis is provided between the second lens unit and the third lens unit. Conditional formulae (11), (12), and (13) below are fulfilled:

$$0.2 < \phi 3/\phi W < 1.0 \quad (11)$$

$$1.5 < \phi 3/\phi T < 10.0 \quad (12)$$

$$-2.0 < M4/M3 < 2.0 \quad (13)$$

where
- φ3 represents the optical power of the third lens unit,
- φW represents the optical power of the entire system at the wide-angle end,
- φT represents the optical power of the entire system at the telephoto end,
- M3 represents the amount of relative movement of the third lens unit in variable magnification from the wide-angle end to the telephoto end, with movement toward the object side being defined as positive, and
- M4 represents the amount of relative movement of the fourth lens unit in variable magnification from the wide-angle end to the telephoto end, with movement toward the object side being defined as positive.

BRIEF DESCRIPTION OF THE DRAWINGS

FIGS. 7A to 7I are aberration diagrams of Example 2;

FIGS. 8A to 8I are aberration diagrams of Example 3;

DETAILED DESCRIPTION OF PREFERRED EMBODIMENTS

Hereinafter, a variable magnification optical system, an image-taking apparatus, and the like embodying the present invention will be described with reference to the drawings. The image-taking apparatus according to the present invention is an optical apparatus that optically takes in an image of a subject and then outputs it in the form of an electrical signal. Such an image-taking apparatus is used as a main component of a camera that is used to photograph a still or moving picture of a subject. Examples of such cameras include digital cameras, video cameras, surveillance cameras, car-mounted cameras, cameras for videophones, cameras for intercoms, and cameras incorporated in or externally fitted to personal computers, portable information appliances (compact, portable information terminal, such as mobile computers, cellular phones, personal digital assistants PDAs)), peripheral devices therefore (such as mouses, scanners, printers, memories), other digital appliances, and the like. As these examples show, by the use of an image-taking apparatus, it is possible not only to build a camera but also to incorporate an image-taking apparatus in various devices to provide them with a camera capability. For example, it is possible to realize a digital appliance provided with an image input capability, such as a cellular phone furnished with a camera.

The term "digital camera" in its conventional sense denotes one that exclusively records optical still pictures, but, now that digital still cameras and home-use digital movie cameras that can handle both still and moving pictures have been proposed, the term has come to be used to denote either type. Accordingly, in the present specification, the term "digital camera" denotes any camera that includes as its main component an image-taking apparatus provided with an image-taking lens system for forming an optical image, an image sensor for converting the optical image into an electrical signal, and other components, examples of such cameras including digital still cameras, digital movie cameras, and Web cameras (i.e., cameras that are connected, either publicly or privately, to a device connected to a network to permit transmission and reception of images, including both those connected directly to a network and those connected to a network by way of a device, such as a personal computer, having an information processing capability).

Figure 1:
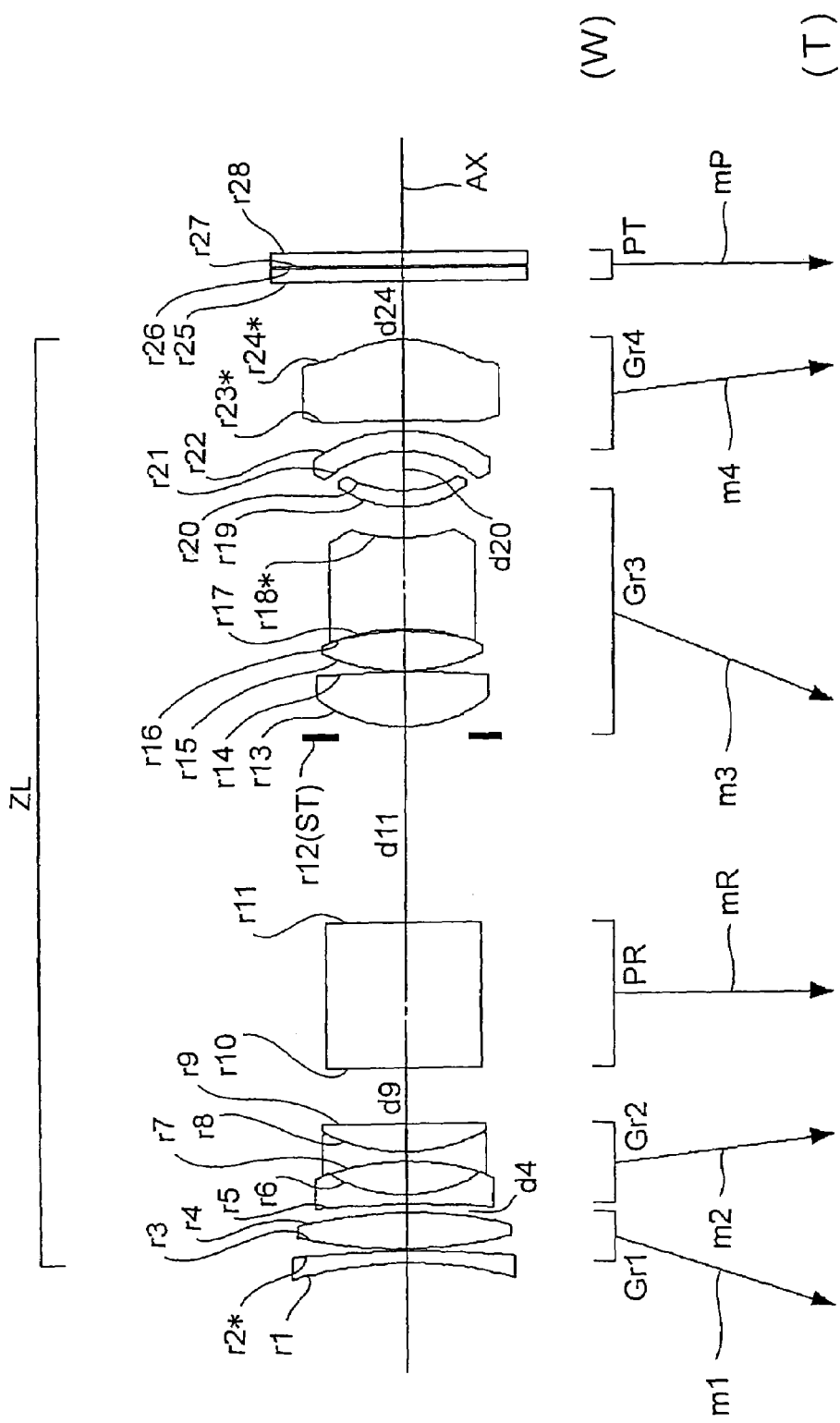
FIG. 1 is a lens construction diagram of a first embodiment (Example 1) according to the present invention.
Figure 2:
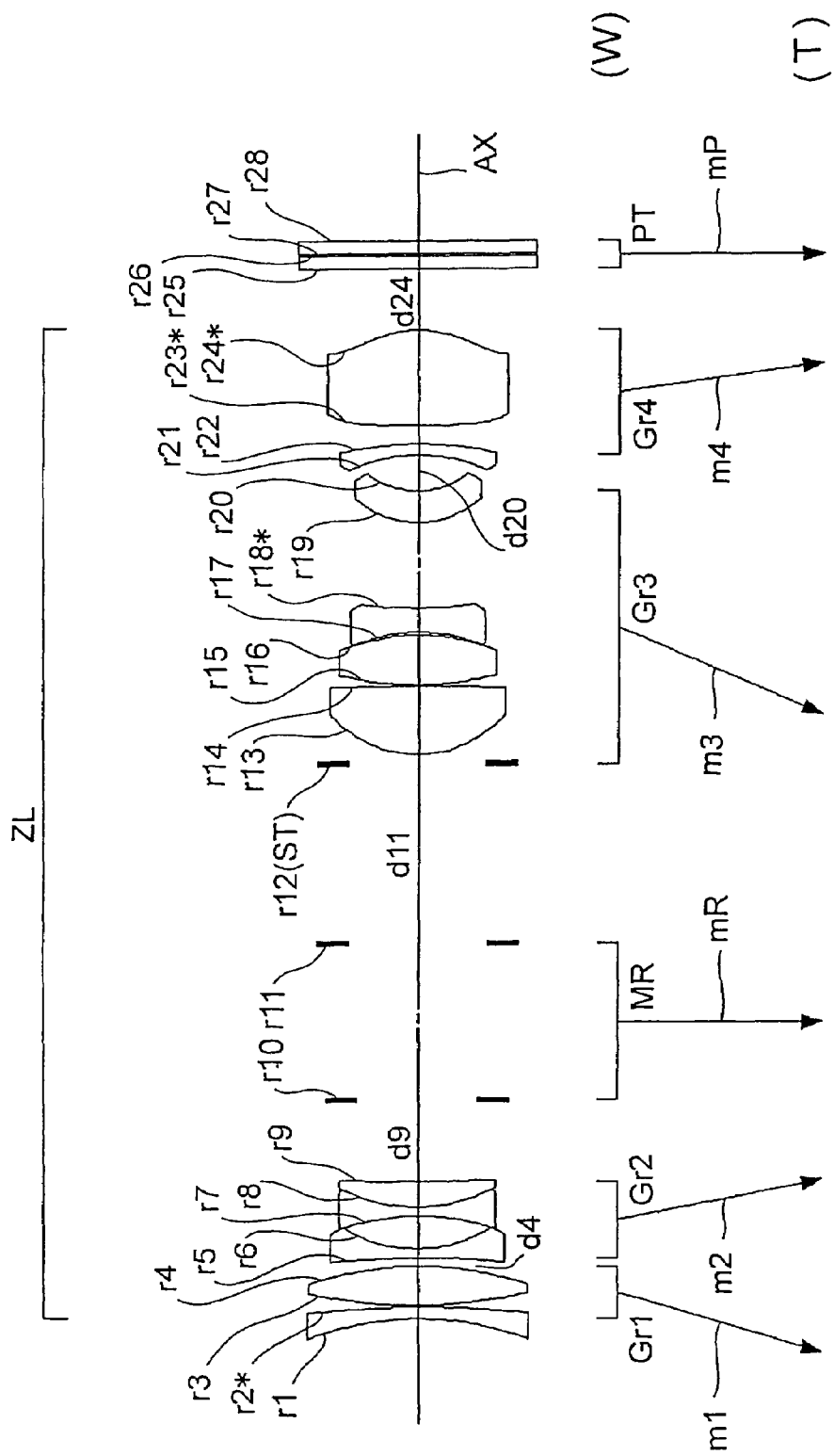
FIG. 2 is a lens construction diagram of a second embodiment (Example 2) according to the present invention.
Figure 3:
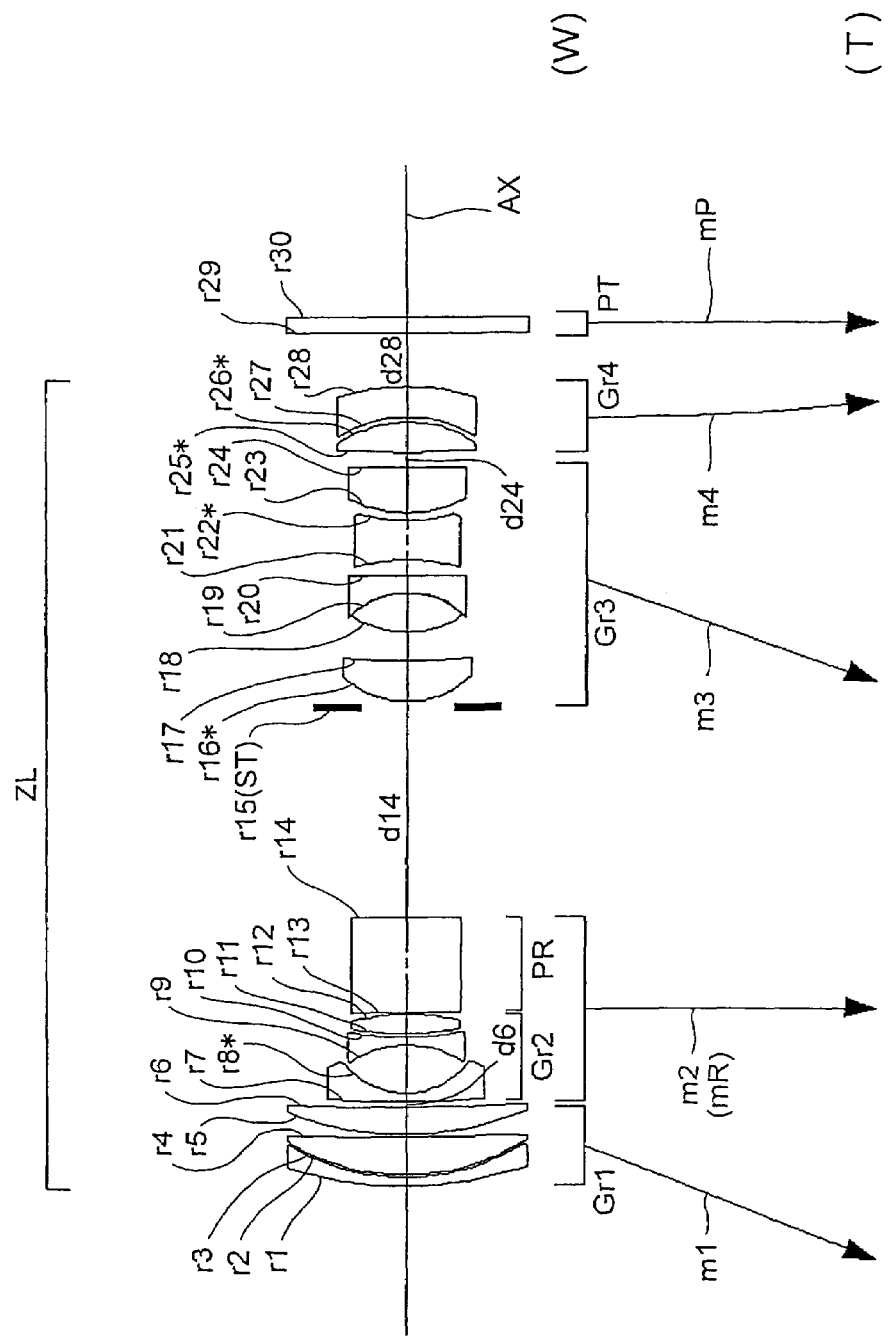
FIG. 3 is a lens construction diagram of a third embodiment (Example 3) according to the present invention.
Figure 4:
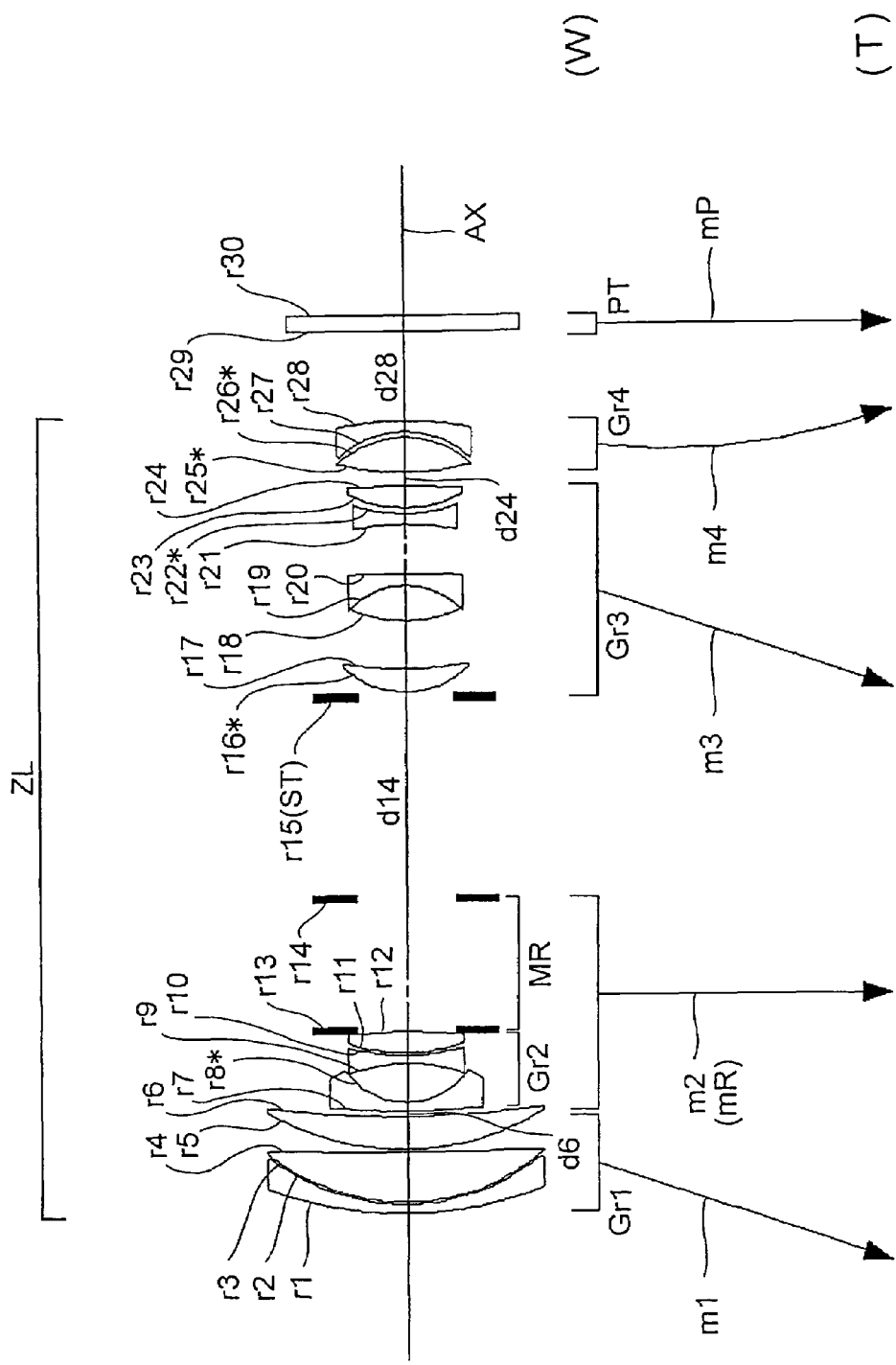
FIG. 4 is a lens construction diagram of a fourth embodiment (Example 4) according to the present invention.
Figure 5:
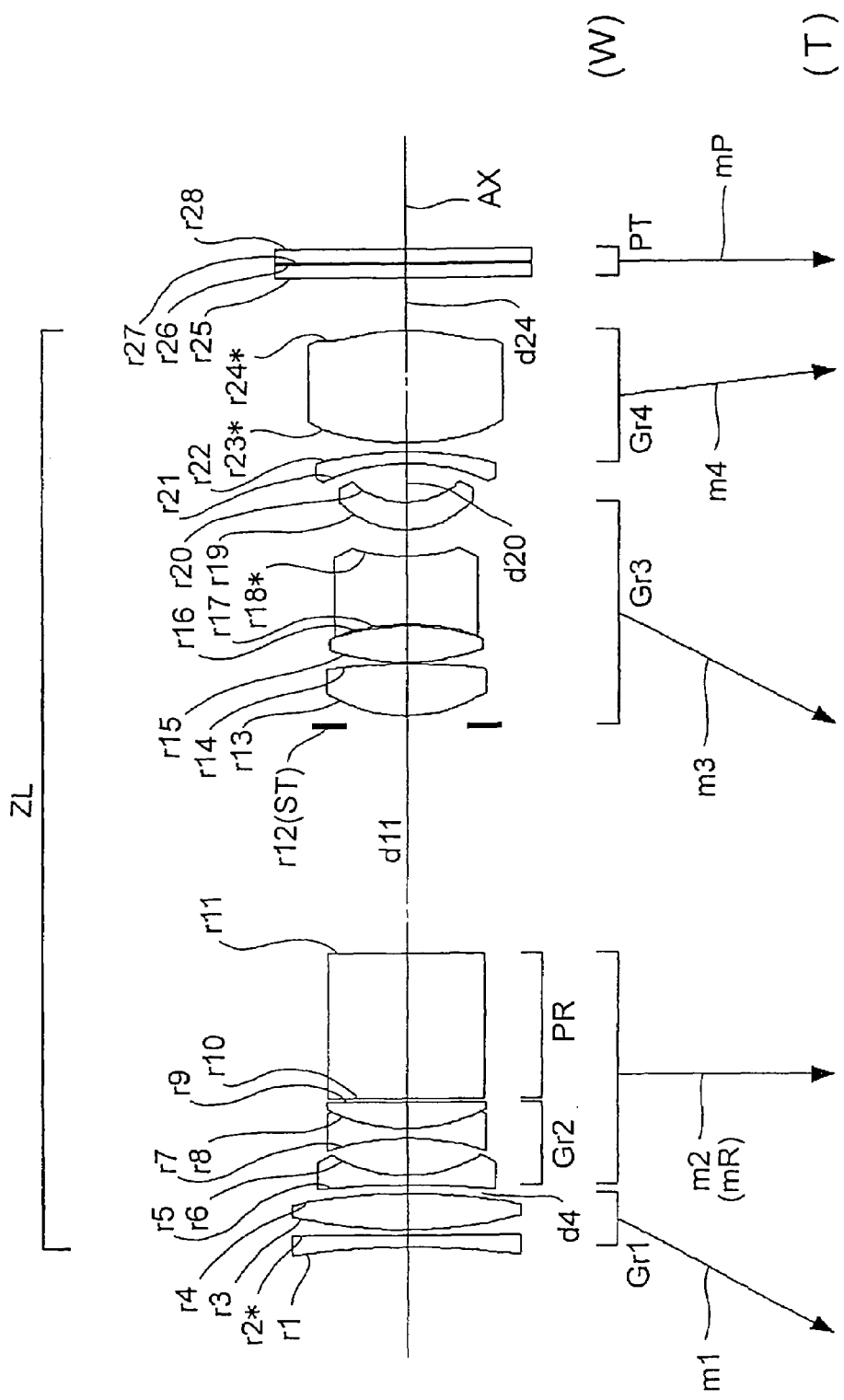
FIG. 5 is a lens construction diagram of a fifth embodiment (Example 5) according to the present invention.
Figure 6A:
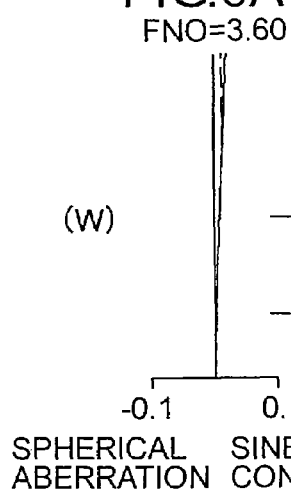
FIGS. 6A to 6I are aberration diagrams of Example 1.
Figure 6B:
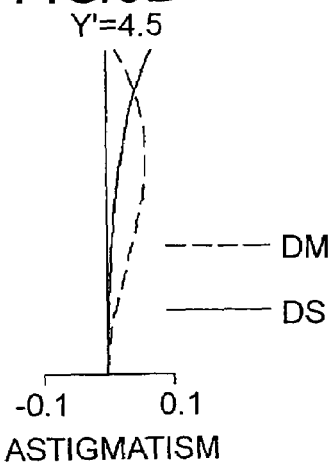
Figure 6C:
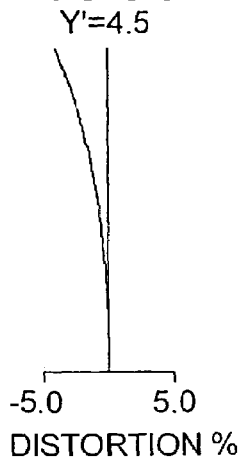
Figure 6D:
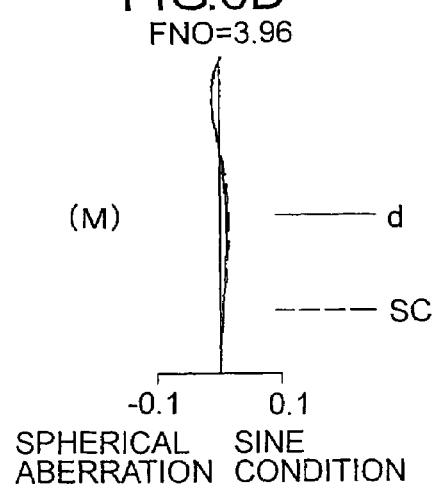
Figure 6E:
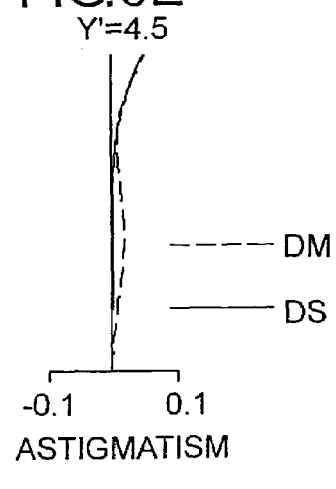
Figure 6F:
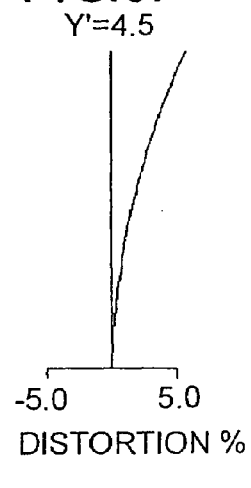
Figure 6G:
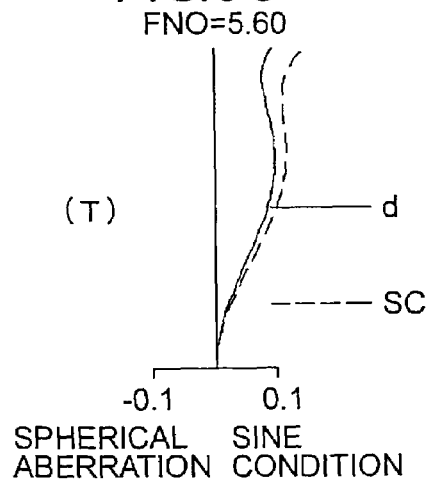
Figure 6H:
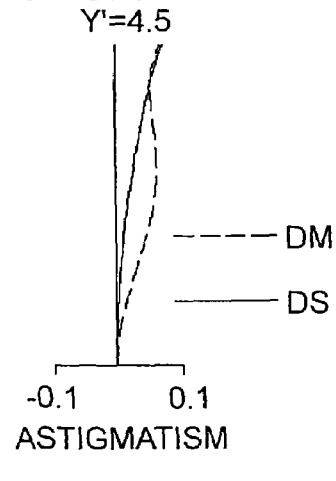
Figure 6I:
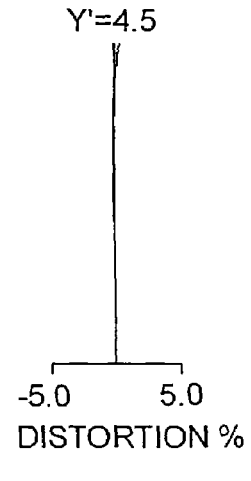
Figure 9A:
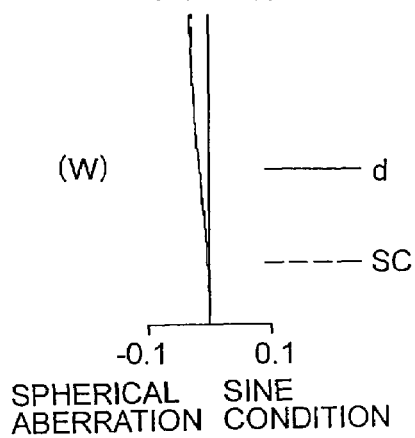
FIGS. 9A to 9I are aberration diagrams of Example 4.
Figure 9B:
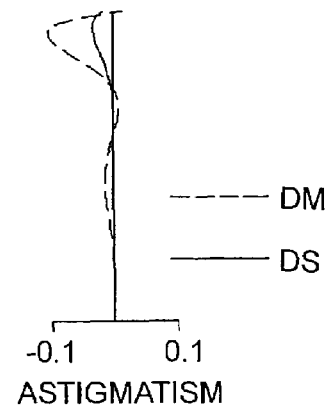
Figure 9C:
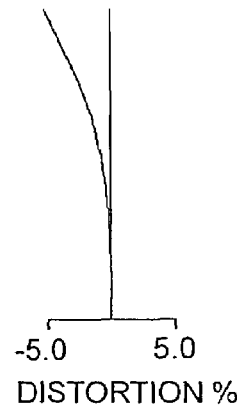
Figure 9D:
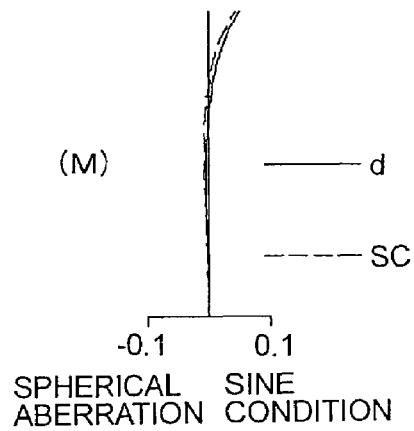
Figure 9E:
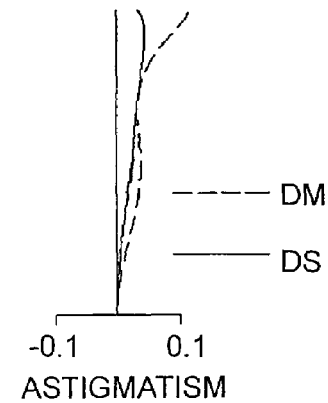
Figure 9F:
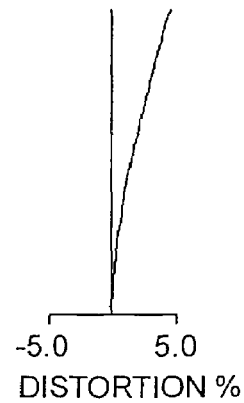
Figure 9G:
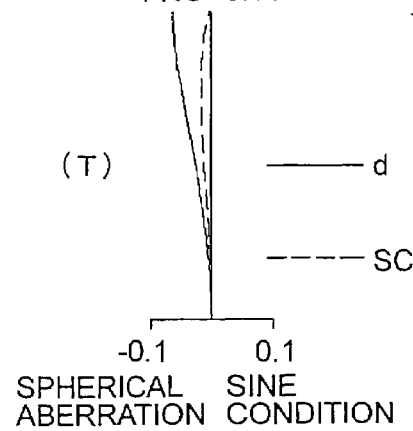
Figure 9H:
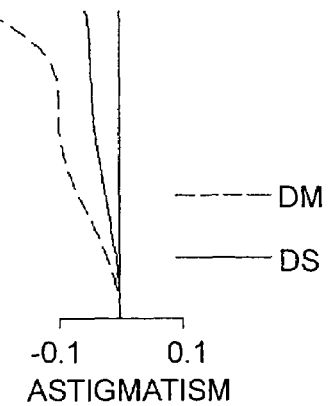
Figure 9I:
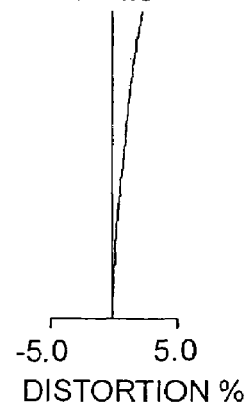
Figure 10A:
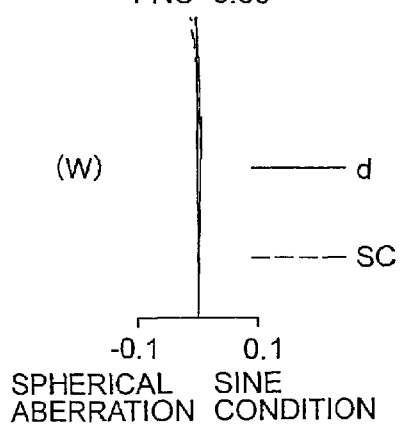
FIGS. 10A to 10I are aberration diagrams of Example 5.
Figure 10B:
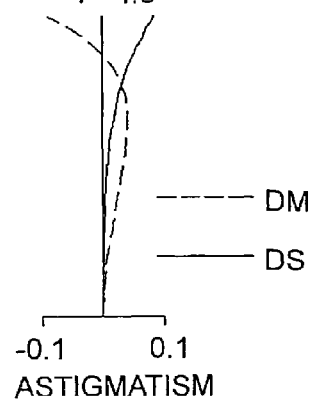
Figure 10C:
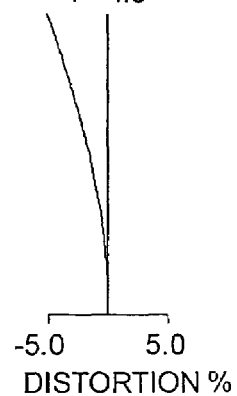
Figure 10D:
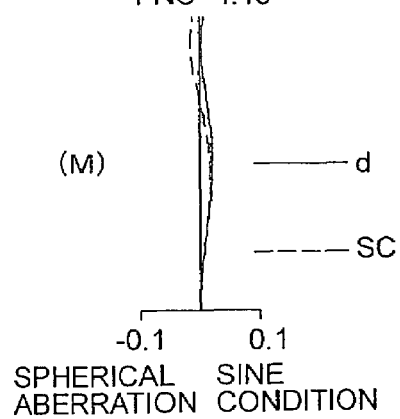
Figure 10E:
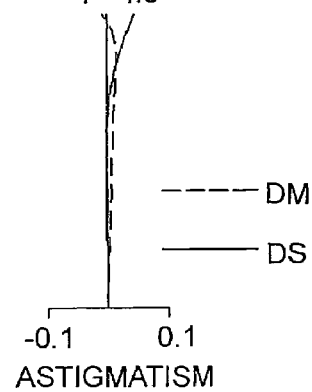
Figure 10F:
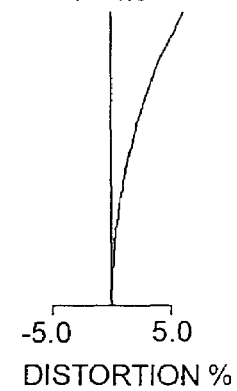
Figure 10G:
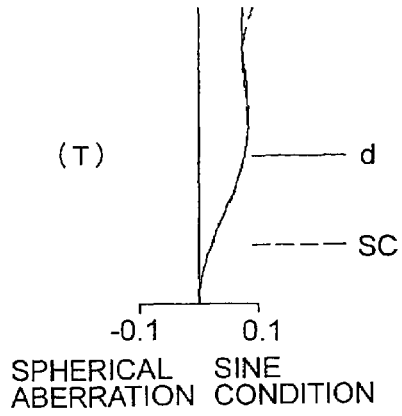
Figure 10H:
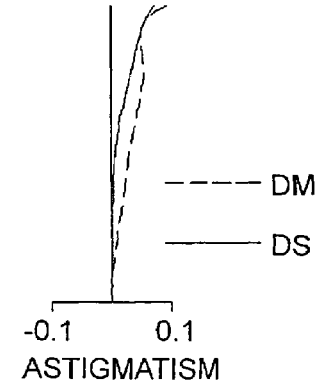
Figure 10I:
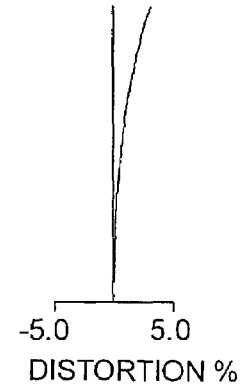
Figure 11:
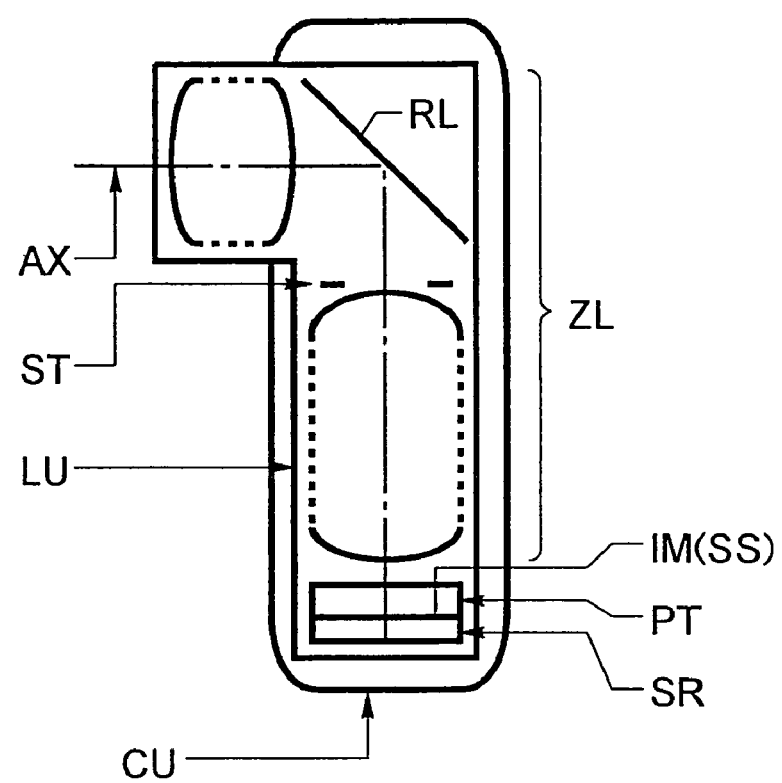
FIG. 11 is a side sectional view showing an example of the schematic optical construction of a camera equipped with an image-taking apparatus according to the invention.
Figure 12:
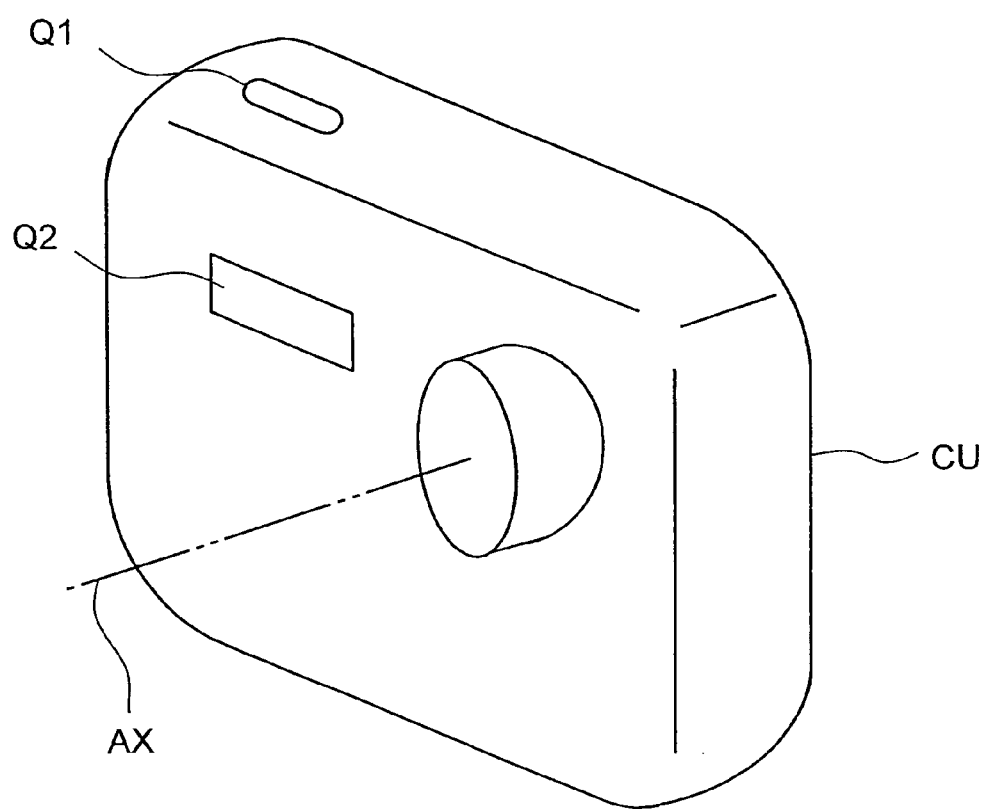
FIG. 12 is a perspective view showing an example of external construction of the camera equipped with the image-taking apparatus.

FIG. 11 shows an example of the schematic optical construction of a camera CU (corresponding to a digital camera, a digital appliance provided with an image input capability, or the like) with a schematic cross section. FIG. 12 is a perspective view of the camera CU (with Q1 representing a release button, Q2 representing a flash; and AX representing an optical axis). An image-taking apparatus LU mounted in the camera CU includes: from the object (i.e., subject) side thereof, a zoom lens system ZL (corresponding to a variable magnification optical system as an image-taking lens system, with ST representing an aperture stop) for forming an optical image (image surface IM) of an object with variable magnification; a parallel-plane plate PT (corresponding to an optical filter such as an optical low-pass filter or infrared cut filter arranged as required, the cover glass of an image sensor SR, or the like); and an image sensor SR for converting the optical image IM formed on the light-receiving surface SS thereof by the zoom lens system ZL into an electrical signal. The image-taking apparatus LU is used as a component of the camera CU corresponding to a digital camera, or the like. When this image-taking apparatus LU is incorporated in a digital camera, the image-taking apparatus LU is usually arranged inside the body of the camera. Here, the camera capability can be realized in a desired manner that suits particular needs. For example, the image-taking apparatus LU may be built as a unit that is freely detachable from or freely rotatable relative to the body of the camera; or the image-taking apparatus LU may be built as a unit that is freely detachable from or freely rotatable relative to a portable information appliance (such as a cellular phone or PDA).

The image-taking apparatus shown in FIG. 11 has a planar reflective surface RL arranged at some point of the optical path in the zoom lens system ZL. On the front and rear sides of the reflective surface RL, there is arranged at least one lens element each. The optical path is bent by this reflective surface RL so as to use the zoom lens system ZL as a bending optical system. In this bending, an optical beam is reflected in such a way as to bend the optical axis AX at approximately 90 degrees (i.e., 90 degrees or substantially 90 degrees). Providing, on the optical path of the zoom lens system ZL, the reflective surface RL that bends the optical path increases the degree of freedom in the arrangement of the image-taking apparatus LU and also changes the size of the image-taking apparatus LU in the thickness-direction, thereby permitting achieving the slimmed-down appearance of the image-taking apparatus LU. In particular, as is the case with embodiments to be described below (FIGS. 1 to 5), arranging the reflective surface RL between a second lens unit Gr2 and a third lens unit Gr3 permits reducing the camera thickness without enlarging the width and the height of the camera CU. Furthermore, configuring the second and third lens units Gr2 and Gr3 so as to be movable during variable magnification permits reducing the optical full length and diameter, permits ensuring the degree of freedom for aberration correction, and the like. The position at which the optical path is bent is not limited to some point in the zoom lens system ZL, but may be set in front of or behind the zoom lens system ZL as appropriate. The adequate bending of the optical path can effectively achieve the downsizing as well as slimmed-down appearance of the camera CU where the image-taking apparatus LU is installed.

The reflective surface RL is realized with a reflective optical element, such as a kind of prism (e.g., a rectangular prism) or a kind of mirror (e.g., a flat mirror). For example, in the embodiments described below (FIGS. 1 to 5), a prism PR or a mirror ML of a reflective optical element is used as a bending optical element for bending the optical axis AX. An optical beam is reflected by one reflective surface RL in such a way as to bend the optical axis AX of the zoom lens system ZL at approximately 90 degrees. Alternatively, the bending optical element may have two or more reflective surfaces. That is, a reflective optical element may be used which reflects an optical beam by two or more reflective surfaces in such a way as to bend the optical axis AX of the zoom lens system ZL at approximately 90 degrees. The optical mechanism for bending the optical path is not limited to reflection, but it can also be refraction, diffraction, or those in combination. That is, a bending optical element including a reflective surface, a refractive surface, a diffractive surface, or those in combination may be used. The prism PR or the mirror ML used in the embodiments below has no optical power (that is, a quantity defined as the reciprocal of the focal length). It is, however, also possible to give an optical power to the bending optical element for bending an optical path. For example, the reflective surface RL, the light-entrance-side surface, the light-exit-side surface of the prism PR, the reflective surface RL of the mirror MR, and the like may share the optical power of the zoom lens system ZL. This makes it possible to alleviate the burden on the lens elements in terms of the optical power they are responsible for, and thereby to obtain higher optical performance.

The zoom lens system ZL includes a plurality of lens units so that the plurality of lens units move along the optical axis AX and interval between lens units is varied to achieve variable magnification (i.e. zooming). In the embodiments described below (FIGS. 1 to 5), the zoom lens system ZL has four-unit zoom construction composed of a positive, a negative, a positive, and a positive lens units. In the first and second embodiments, the first to fourth lens units Gr1 to Gr4 are movable units. In the third to fifth embodiments, the first lens unit Gr1, the third lens unit Gr3, and the fourth lens unit Gr4 are movable units. The image-taking lens system to be used in the image-taking apparatus LU is not limited to the zoom lens system ZL. Instead of the zoom lens system ZL, other types of variable magnification optical systems (for example, a variable-focal-length imaging optical system such as a varifocal lens system or a lens system that permits switching among a plurality of focal lengths) may be used as an image-taking lens system.

An optical image to be formed by the zoom lens system ZL passes through the optical low-pass filter (corresponding to the parallel-plane plate PT shown in FIG. 11) having a predetermined cutoff frequency characteristic that depends on the pixel pitch of the image sensor SR, and meanwhile the optical image has its spatial frequency characteristic so adjusted as to minimize so-called aliasing noise generated when the optical image is converted into an electric signal. This helps alleviate the generation of color moiré. Aiming at moderate performance around the resolution limit frequency makes it possible to disregard the generation of noise without the use of an optical low-pass filter. Moreover, in a case where the user photographs or observes images by the use of a display system (such as the liquid crystal display screen of a cellular phone or the like) on which noise is inconspicuous, there is no need to use an optical low-pass filter in the image-taking lens system.

Used as the optical low-pass filter is a birefringence-type low-pass filter, a phase-type low-pass filter, or the like. Examples of birefringence-type low-pass filters include those made of a birefringent material such as quartz having a crystal axis appropriately aligned in a predetermined direction and those composed of wavelength plates or the like, which change the polarization plane, laid on one another. Examples of phase-type low-pass filters include those that achieve required optical cut-off frequency characteristics by exploiting diffraction.

Used as the image sensor SR is a solid-state image sensor such as a CCD (charge-coupled device) or CMOS (complementary metal oxide semiconductor) sensor having a plurality of pixels. The optical image formed (on the light-receiving surface SS of the image sensor SR) by the zoom lens system ZL is converted into an electrical signal by the image sensor SR. The signal produced by the image sensor SR is subjected to predetermined digital image processing, image compression processing, or the like as required, and is recorded into a memory (such as a semiconductor memory or an optical disk) as a digital video signal; in some cases, the signal is transferred to another appliance through a cable or after being converted into an infrared signal.

In the image-taking apparatus LU shown in FIG. 11, the zoom lens system ZL performs reduced projection from the subject on the enlargement side to the image sensor SR on the reduction side. The use of a display element for displaying a two-dimensional image (for example, liquid crystal display element) instead of the image sensor SR, plus the use of the zoom lens system ZL as a projection lens system, can provide an image projector for performing enlarged projection from the image display surface on the reduction side to the screen surface on the enlargement side. That is, the zoom lens system ZL of the embodiments as described below is not limited for use as an image-taking lens system, but favorably usable as a projection lens system.

FIGS. 1 to 5 are lens construction diagrams respectively corresponding to the zoom lens systems ZL used in the first to fifth embodiments, each showing the lens arrangement at the wide-angle end W, with the optical path linearly expanded in optical cross section of the bending optical system. In each of the lens construction diagrams, the following conventions are used. A surface indicated by ri (i=1, 2, 3, . . . ) is the i-th surface counted from the object side, and a surface whose symbol ri is marked with an asterisk (*) is an aspherical surface. An axial distance indicated by di (i=1, 2, 3, . . . ) is the i-th axial distance counted from the object side, though only those axial distances which vary during zooming are shown here. In each of the lens construction diagrams, arrows m1, m2, m3, and m4 represent movement loci that schematically indicate the movement of the first to fourth lens units Gr1 to Gr4, respectively, (i.e., position change relative to the image surface IM) during zooming from the wide-angle end W to the telephoto end T. The arrow mR indicates that the prism PR or the mirror MR is kept in fixed position during zooming. The arrow mP indicates that the parallel-plane plate PT is fixed in position during zooming. In any of the embodiments, the third lens unit Gr3 has on the most object side the aperture stop ST, which serves as a component of the third lens unit Gr3 and moves (in the direction indicated by the arrow m3) during zooming.

The zoom lens systems ZL of each embodiment is composed of four lens units: from the object side, a first lens unit Gr1 having a positive optical power, a second lens unit Gr2 having a negative optical power, a third lens unit Gr3 having a positive optical power, and a fourth lens unit Gr4 having a positive optical power. This zoom lens system ZL has, between the second and third lens units, a bending optical element (prism PR or mirror ML) for bending the optical axis AX, and achieves variable magnification through movements of at least the first and third lens units Gr1 and Gr3. The lens construction of each embodiment will be described below.

In the first embodiment (FIG. 1), in the four-unit zoom construction composed of a positive, a negative, (prism PR), a positive, and a positive lens units, each lens unit is built as follows. The first lens unit Gr1 is composed of: from the object side, a negative meniscus lens element concave to the object side and having an aspherical surface on the image side; and a biconvex positive lens element. The second lens unit Gr2 is composed of: from the object side, a biconcave negative lens element; and a cemented lens element formed of a biconcave negative lens element and a biconvex positive lens element. The third lens unit Gr3 is composed of: from the object side, the aperture stop ST, two biconvex positive lens elements, a biconcave negative lens element having an aspherical surface on the image side, and a positive meniscus lens element convex to the object side. The fourth lens unit Gr4 is composed of: from the object side, a negative meniscus lens element concave to the object side, and a positive meniscus lens element convex to the image side and having aspherical surfaces on both sides. During zooming from the wide-angle end (W) to the telephoto end (T), the first and third lens units Gr1 and Gr3 move toward the object side in a substantially linear manner (i.e., monotonously), the second and fourth lens units Gr2 and Gr4 move toward the image side in a substantially linear manner.

In the second embodiment (FIG. 2), in the four-unit zoom construction composed of a positive, a negative, (the mirror MR), a positive, and a positive lens units, each lens unit is built as follows. The first lens unit Gr1 is composed of: from the object side, a negative meniscus lens element concave to the object side and having an aspherical surface on the image side; and a biconvex positive lens element. The second lens unit Gr2 is composed of: from the object side, a biconcave negative lens element; and a cemented lens element formed of a biconcave negative lens element and a positive meniscus lens element convex to the object side. The third lens unit Gr3 is composed of: from the object side, the aperture stop ST; two biconvex positive lens elements; a biconcave negative lens element having an aspherical surface on the image side; and a negative meniscus lens element concave to the image side. The fourth lens unit Gr4 is composed of: from the object side, a negative meniscus lens element concave to the object side; and a biconvex positive lens element having aspherical surfaces on both sides. During zooming from the wide-angle end (W) to the telephoto end (T), the first and third lens units Gr1 and Gr3 move toward the object side in a substantially linear manner (i.e., monotonously), and the second and fourth lens units Gr2 and Gr4 move toward the image side in a substantially linear manner.

In the third embodiment (FIG. 3), in the four-unit zoom construction composed of a positive, a negative, (the prism PR), a positive, and a positive lens units, each lens unit is built as follows. The first lens unit Gr1 is composed of: from the object side, a negative meniscus lens element concave to the image side; two positive meniscus lens elements convex to the object side. The second lens unit Gr2 is composed of: from the object side, a negative meniscus lens element concave to the image side and having an aspherical surface on the image side; a biconcave negative lens element; and a biconvex positive lens element. The third lens unit Gr3 is composed of: from the object side, the aperture stop ST; a positive meniscus lens element convex to the object side and having an aspherical surface on the object side; a cemented lens element formed of a biconvex positive lens element and a negative meniscus lens element concave to the object side; a biconcave negative lens element having an aspherical surface on the image side; and a biconvex positive lens element. The fourth lens unit Gr4 is composed of: from the object side, a biconvex positive lens element having aspherical surfaces on both sides; and a negative meniscus lens element concave to the object side. During zooming from the wide-angle end (W) to the telephoto end (T), the first and third lens units Gr1 and Gr3 move toward the object side in a substantially linear manner (i.e., monotonously), the second lens unit Gr2 is kept in fixed position, and the fourth lens unit Gr4 moves toward the image side while gradually increasing the speed thereof.

In the fourth embodiment (FIG. 4), in the four-unit zoom construction composed of a positive, a negative, (the mirror MR), a positive, and a positive lens units, each lens unit is built as follows. The first lens unit Gr1 is composed of: from the object side, a negative meniscus lens element concave to the image side; and two positive meniscus lens elements convex to the object side. The second lens unit Gr2 is composed of: from the object side, a negative meniscus lens element concave to the image side and having an aspherical surface on the image side; a biconcave negative lens element; and a biconvex positive lens element. The third lens unit Gr3 is composed of: from the object side, the aperture stop ST; a positive meniscus lens element convex to the object side and having an aspherical surface on the object side; a cemented lens element formed of a biconvex positive lens element and a negative meniscus lens element concave to the object side; a biconcave negative lens element having an aspherical surface on the image side; and a biconvex positive lens element. The fourth lens unit Gr4 is composed of: from the object side, a biconvex positive lens element having aspherical surfaces on both sides; and a negative meniscus lens element concave to the object side. During zooming from the wide-angle end (W) to the telephoto end (T), the first and third lens units Gr1 and Gr3 move toward the object side in a substantially linear manner (i.e., monotonously), the second lens unit Gr2 is kept in fixed position, and the fourth lens unit Gr4 moves toward the object side, and then moves from the object side back toward the image side.

In the fifth embodiment (FIG. 5), in the four-unit zoom construction composed of a positive, a negative, (the prism PR), a positive, and a positive lens units, each lens unit is built as follows. The first lens unit Gr1 is composed of: from the object side, a negative meniscus lens element concave to the object side and having an aspherical surface on the image side; and a biconvex positive lens element. The second lens unit Gr2 is composed of: from the object side, a biconcave negative lens element; and a cemented lens element formed of a biconcave negative lens element and a biconvex positive lens element. The third lens unit Gr3 is composed of: from the object side, the aperture stop ST; two biconvex positive lens elements; a biconcave negative lens element having an aspherical surface on the image side; and a negative meniscus lens element concave to the image side. The fourth lens unit Gr4 is composed of: from the object side, a negative meniscus lens element concave to the object side; and a biconvex positive lens element having aspherical surfaces on both sides. During zooming from the wide-angle end (W) to the telephoto end (T), the first and third lens units Gr1 and Gr3 move toward the object side in a substantially linear manner (i.e., monotonously), the second lens unit Gr2 is kept in fixed position, and fourth lens unit Gr4 moves toward the image side in a substantially linear manner.

In any of the embodiments described above, the variable magnification optical system composed of at least four lens units has the bending optical element for bending an optical axis arranged between the second lens unit and the third lens unit, and performs variable magnification through movement of at least two lens elements. To obtain a high magnification variation ratio with the variable magnification optical system of the type, it is preferable that four lens units, i.e., from the object side, a positive, a negative, a positive, and a positive lens units, be included and that variable magnification is performed through movements of the first and third lens units. The adoption of such a configuration that the first and third lens units move during variable magnification permits a reduction in the front lens diameter and shortening the variable magnification optical system in the camera thickness direction. For an interval change between lens units at the time of variable magnification, it is preferable that, during variable magnification from the wide-angle end to the telephoto end, the interval between the first and second lens units increase while the interval between the second and third lens units decreases. The adoption of such a configuration permits ensuring sufficient back focus at the wide-angle end while permitting a reduction in the full length at the telephoto end. The arrangement of the bending optical element between the second and third lens units permits a reduction in the full length without increasing the camera thickness, thus suppressing an increase in the full length which usually accompanies higher magnification variation. That is, this arrangement permits optimization of the full length and the thickness of the variable magnification optical system.

It is preferable that, as in the first, second, and fifth embodiments, the first lens unit have on the most object side a negative meniscus lens element concave to the object side. Arranging, as the first lens element, the negative meniscus lens element concave to the object side can locate the entrance pupil position closer, thus permitting a reduction in the lens diameters (the lens diameter of the first lens unit in particular) located before the aperture stop. This in turn permits slimming down the variable magnification optical system in the thickness direction of the camera. From the view point of aberration correction, it is preferable that the first lens unit have at least one negative lens element and one positive lens element and that the second lens unit have at least one negative lens element and one positive lens element.

As in the embodiments, in a variable magnification optical system composed of at least four lens units, configuring the variable magnification optical system which has, between the second and third lens units, a bending optical element for bending an optical axis, and which performs variable magnification through movement of at least two lens units so as to satisfy respective predetermined conditions for the power, the amount of movement, and the like of each lens unit permits achieving a variable magnification optical system with higher magnification variation while achieving a more compact size (i.e., a shorter full length and a shorter dimension in the thickness direction of the camera) and a higher performance. The use of an image-taking apparatus provided with such a variable magnification optical system in apparatuses such as a digital camera, therefore, can contribute to achieving slimming-down, weight saving, downsizing, cost reduction, performance enhancement, function enhancement, and the like of these appliances. The conditions for obtaining these effects in a well-balanced manner and for achieving an even higher optical performance, and the like will be described below. Considering the balance among the magnification variation ratio, performance enhancement, downsizing, and the like, the magnification variation ratio to satisfy the conditions described below is preferably ×5, and more preferably ×5 to ×10.

For the movement of the first lens unit, it is preferable that conditional formula (1) below be fulfilled.

$$0.5 < M1 \times \phi W < 5.0 \tag{1}$$

where

M1 represents the amount of relative movement of the first lens unit in variable magnification from the wide-angle end to the telephoto end (with movement toward the object side being defined as positive), and $\phi W$ represents the optical power of the entire system at the wide-angle end.

The conditional formula (1) defines a preferable conditional range in regard to the amount of relative movement of the first lens unit. This amount of relative movement corresponds to the amount of relative displacement at the telephoto end with respect to the position at the wide-angle end. Therefore, if the position of the first lens unit at the wide-angle end agrees with the position of the first lens unit at the telephoto end, the amount of relative movement of the first lens unit is equal to zero. Configuring the first lens unit to move during variable magnification so as to satisfy the conditional formula (1) permits a reduction in the full length at the wide-angle end, and further permits a reduction in the front lens diameter. If the lower limit of the conditional formula (1) is disregarded, the amount of movement of the first lens unit becomes too small, thus resulting in an increase in the full length at the wide-angle end and also leading to an increase in the front lens diameter for ensuring the peripheral light beam on the wide-angle side. By contrast, if the upper limit of the conditional formula (1) is disregarded, the amount of movement of the first lens unit becomes too large, thus resulting in an increase in the full length at the telephoto end and also leading to an increase in the front lens diameter for ensuring the peripheral light beam on the telephoto end side.

It is further preferable that conditional formula (1a) below be fulfilled.

$$0.5 < M1 \times \phi W < 3.5 \tag{1a}$$

This conditional formula (1a) defines, within the conditional range defined by the conditional formula (1), a conditional range further preferable out of the above-stated points and other considerations.

For the optical power of the first lens unit, it is preferable that conditional formula (2) be fulfilled. It is further preferable that the first lens unit have at least one positive lens element and at least one negative lens element, and that the conditional formula (2) below be fulfilled.

$$0.05 < \phi 1/\phi W < 0.45 \tag{2}$$

where $\phi 1$ represents the optical power of the first lens unit, and
$\phi W$ represents the optical power of the entire system at the wide-angle end.

The conditional formula (2) defines a preferable conditional range in regard to the optical power of the first lens unit. If the lower limit of the conditional formula (2) is disregarded, the positive optical power of the first lens unit becomes too weak, and thus the full length at the telephoto end becomes larger, thereby leading to upsizing of the camera. By contrast, if the upper limit of the conditional formula (2) is disregarded, the positive optical power of the first lens unit becomes too strong, so that spherical aberration on the telephoto side appears markedly in the under direction.

It is further preferable that conditional formula (2a) below be fulfilled.

$$0.1 < \phi 1/\phi W < 0.3 \tag{2a}$$

This conditional formula (2a) defines, within the conditional range defined by the conditional formula (2), a conditional range further preferable out of the above-stated points and other considerations.

For the optical power of the first lens unit, it is preferable that conditional formula (3) below be fulfilled. It is further preferable that the first lens unit have at least one positive lens element and at least one negative lens element, and that the conditional formula (3) below be fulfilled.

$$0.5 < \phi 1/\phi T < 4.5 \tag{3}$$

where $\phi 1$ represents the optical power of the first lens unit, and
$\phi T$ represents the optical power of the entire system at the telephoto end.

The conditional formula (3) defines a preferable conditional range in regard to the optical power of the first lens unit. If the lower limit of the conditional formula (3) is disregarded, the positive optical power of the first lens unit becomes too weak, thus resulting in an increase in the full length at the telephoto end, which leads to upsizing of the camera. By contrast, if the upper limit of the conditional formula (3) is disregarded, the positive optical power of the first lens unit becomes too strong, so that spherical aberration on the telephoto side appears markedly in the under direction.

It is further preferable that conditional formula (3a) below be fulfilled.

$$1.0<\phi 1/\phi T<2.5 \tag{3a}$$

This conditional formula (3a) defines, within the conditional range defined by the conditional formula (3), a conditional range further preferable out of the above-stated points and other considerations.

For the optical power of a positive lens element composing the first lens unit, it is preferable that conditional formula (4) below be fulfilled. It is further preferable that the first lens unit have at least one positive lens element and at least one negative lens element, and that the conditional formula (4) below be fulfilled.

$$0.05<\phi 1P/\phi W<2.0 \tag{4}$$

where
  $\phi 1P$ represents the optical power of the positive lens element that has the largest positive optical power in the first lens unit, and
  $\phi W$ represents the optical power of the entire system at the wide-angle end.

The conditional formula (4) defines a preferable conditional range in regard to the optical power of the positive lens element included in the fist lens unit. If the lower limit of the conditional formula (4) is disregarded, it becomes difficult to correct chromatic aberration occurring in the first lens unit. By contrast, if the upper limit of the conditional formula (4) is disregarded, spherical aberration on the telephoto side appears markedly in the under direction.

It is further preferable that conditional formula (4a) below be fulfilled.

$$0.1<\phi 1P/\phi W<1.0 \tag{4a}$$

This conditional formula (4a) defines, within the conditional range defined by the conditional formula (4), a conditional range further preferable out of the above-stated points and other considerations.

For the optical power of a negative lens element composing the first lens unit, it is preferable that conditional formula (5) below be fulfilled. It is further preferable that the first lens unit have at least one positive lens element and at least one negative lens element, and that the conditional formula (5) below be fulfilled.

$$0.05<|\phi 1N/\phi W|<2.0 \tag{5}$$

where
  $\phi 1N$ represents the optical power of the negative lens element that has the largest negative optical power in the first lens unit, and
  $\phi W$ represents the optical power of the entire system at the wide-angle end.

The conditional formula (5) defines a preferable conditional range in regard to the optical power of the negative lens element included in the fist lens unit. If the conditional formula (5) is fulfilled, in combination with the configuration that fulfills the conditional formula (4), aberration occurring in the first lens unit, mainly chromatic aberration and spherical aberration, can be corrected satisfactorily.

It is further preferable that conditional formula (5a) below be fulfilled.

$$0.1<|\phi 1N/\phi W|<1.0 \tag{5a}$$

This conditional formula (5a) defines, within the conditional range defined by the conditional formula (5), a conditional range further preferable out of the above-stated points and other considerations.

For the optical power of the second lens unit, it is preferable that conditional formula (6) below be fulfilled. It is further preferable that the second lens unit have at least one positive lens element and at least one negative lens element, and that the conditional formula (6) be fulfilled.

$$0.5<|\phi 2/\phi W|<3.0 \tag{6}$$

where
  $\phi 2$ represents the optical power of the second lens unit, and
  $\phi W$ represents the optical power of the entire system at the wide-angle end.

The conditional formula (6) defines a preferable conditional range in regard to the optical power of the second lens unit. If the lower limit of the conditional formula (6) is disregarded, the negative optical power of the second lens unit becomes too weak, thus resulting in an increase in the full length at the telephoto end, which leads to upsizing of the camera. By contrast, if the upper limit of the conditional formula (6) is disregarded, the negative optical power of the second lens unit becomes too strong, thus resulting in an increase in negative distortion on the wide-angle side.

It is further preferable that conditional formula (6a) below be fulfilled.

$$0.5<|\phi 2/\phi W|<1.5 \tag{6a}$$

This conditional formula (6a) defines, within the conditional range defined by the conditional formula (6), a conditional range further preferable out of the above-stated points and other considerations.

For the optical power of the second lens unit, it is preferable that conditional formula (7) below be fulfilled. It is further preferable that the second lens unit have at least one positive lens element and at least one negative lens element, and that the conditional formula (7) be fulfilled.

$$1.0<|\phi 2/\phi T|<15.0 \tag{7}$$

where
  $\phi 2$ represents the optical power of the second lens unit, and
  $\phi T$ represents the optical power of the entire system at the telephoto end.

The conditional formula (7) defines a preferable conditional range in regard to the optical power of the second lens unit. If the lower limit of the conditional formula (7) is disregarded, the negative optical power of the second lens unit becomes too weak, thus resulting in an increase in the full length at the telephoto end, which leads to upsizing of the camera. By contrast, if the upper limit of the conditional formula (7) is disregarded, the negative optical power of the second lens unit becomes too strong, thus resulting in an increase in negative distortion on the wide-angle side.

It is further preferable that conditional formula (7a) below be fulfilled.

$$3.0<|\phi 2/\phi T|<12.0 \tag{7a}$$

This conditional formula (7a) defines, within the conditional range defined by the conditional formula (7), a conditional range further preferable out of the above-stated points and other considerations.

For the optical power of a positive lens element composing the second lens unit, it is preferable that conditional formula (8) below be fulfilled. It is further preferable that the second lens unit have at least one positive lens element and at least one negative lens element, and that the conditional formula (8) be fulfilled.

$$0.05<\phi2P/\phi W<2.0 \quad (8)$$

where
- $\phi2P$ represents the optical power of the positive lens element that has the largest positive optical power in the second lens unit, and
- $\phi W$ represents the optical power of the entire system at the wide-angle end.

The conditional formula (8) defines a preferable conditional range in regard to the optical power of the positive lens element included in the second lens unit. If the conditional formula (8) is fulfilled, aberration occurring in the second lens unit, mainly distortion and chromatic aberration on the wide-angle side, can be corrected satisfactorily.

It is further preferable that conditional formula (8a) below be fulfilled.

$$0.1<\phi2P/\phi W<1.0 \quad (8a)$$

This conditional formula (8a) defines, within the conditional range defined by the conditional formula (8), a conditional range further preferable out of the above-stated points and other considerations.

For the optical power of a negative lens element composing the second lens unit, it is preferable that conditional formula (9) below be fulfilled. It is further preferable that the second lens unit have at least one positive lens element and at least one negative lens element, and that the conditional formula (9) be fulfilled.

$$0.1<|\phi2N/\phi W|<3.0 \quad (9)$$

where
- $\phi2N$ represents the optical power of the negative lens element that has the largest negative optical power in the second lens unit, and
- $\phi W$ represents the optical power of the entire system at the wide-angle end.

The conditional formula (9) defines a preferable conditional range in regard to the optical power of the negative lens element included in the second lens unit. If the conditional formula (9) is fulfilled, aberration occurring in the second lens unit, mainly distortion and chromatic aberration on the wide-angle side, can be corrected satisfactorily.

It is further preferable that conditional formula (9a) below be fulfilled.

$$0.3<|\phi2N/\phi W|<1.5 \quad (9a)$$

This conditional formula (9a) defines, within the conditional range defined by the conditional formula (9), a conditional range further preferable out of the above-stated points and other considerations.

It is preferable that, during variable magnification, the third lens unit move in such a manner as to be located on a more object side at the telephoto end than at the wide-angle end. It is further preferable that conditional formula (10) below be fulfilled.

$$0.0<M3\times\phi T<0.8 \quad (10)$$

where
- M3 represents the amount of relative movement of the third lens unit in variable magnification from the wide-angle end to the telephoto end (with movement toward the object side being defined as positive), and
- $\phi T$ represents the optical power of the entire system at the telephoto end.

The conditional formula (10) defines a preferable conditional range in regard to the amount of relative movement of the third lens unit. This amount of relative movement corresponds to the amount of relative displacement at the telephoto end with respect to the position at the wide-angle end. Therefore, if the position of the third lens unit at the wide-angle end agrees with the position of the third lens unit at the telephoto end, the amount of relative movement of the third lens unit is equal to zero. If the lower limit of the conditional formula (10) is disregarded, the third lens unit reduces its magnification variation, and thus the amount of movement of the first lens unit becomes extremely larger, thus leading to an increase in the full length at the telephoto end. By contrast, if the upper limit of the conditional formula (10) is disregarded, the interval between the second and third lens units at the wide-angle end becomes too large, thus leading to an increase in the front lens diameter at the wide-angle end.

It is further preferable that conditional formula (10a) below be fulfilled:

$$0.1<M3\times\phi T<0.5 \quad (10a)$$

This conditional formula (10a) defines, within the conditional range defined by the conditional formula (10), a conditional range further preferable out of the above-stated points and other considerations.

For the optical power of the third lens unit, it is preferable that conditional formula (11) below be fulfilled:

$$0.2<\phi3/\phi W<1.0 \quad (11)$$

where
- $\phi3$ represents the optical power of the third lens unit, and
- $\phi W$ represents the optical power of the entire system at the wide-angle end.

The conditional formula (11) defines a preferable conditional range in regard to the optical power of the third lens unit. If the lower limit of the conditional formula (11) is disregarded, spherical aberration on the telephoto side appears markedly in the over direction. By contrast, if the upper limit of the conditional formula (11) is disregarded, spherical aberration on the telephoto side appears markedly in the under direction.

It is further preferable that conditional formula (11a) below be fulfilled.

$$0.2<\phi3/\phi W<0.8 \quad (11a)$$

This conditional formula (11a) defines, within the conditional range defined by the conditional formula (11), a conditional range further preferable out of the above-stated points and other considerations.

For the optical power of the third lens unit, it is preferable that conditional formula (12) below be fulfilled:

$$1.5<\phi3/\phi T<10.0 \quad (12)$$

where
- $\phi3$ represents the optical power of the third lens unit, and
- $\phi T$ represents the optical power of the entire system at the telephoto end.

The conditional formula (12) defines a preferable conditional range in regard to the optical power of the third lens unit. If the lower limit of the conditional formula (12) is disregarded, spherical aberration on the telephoto side appears markedly in the over direction. By contrast, if the upper limit of the conditional formula (12) is disregarded, spherical aberration on the telephoto side appears markedly in the under direction.

It is further preferable that conditional formula (12a) below be fulfilled.

$$2.5<\phi 3/\phi T<7.0 \tag{12a}$$

This conditional formula (12a) defines, within the conditional range defined by the conditional formula (12), a conditional range further preferable out of the above-stated points and other considerations.

For the amounts of movement of the first and third lens units, it is preferable that conditional formula (13) below be fulfilled:

$$-2.0<M4/M3<2.0 \tag{13}$$

where

M3 represents the amount of relative movement of the third lens unit in variable magnification from the wide-angle end to the telephoto end (with movement toward the object side being defined as positive), and M4 represents the amount of relative movement of the fourth lens unit in variable magnification from the wide-angle end to the telephoto end (with movement toward the object side being defined as positive).

The conditional formula (13) defines a preferable conditional range in regard to the movement ratio of the third lens unit to the fourth lens unit. The amounts of relative movement of the third and fourth lens units correspond to the amounts of relative displacement at the telephoto end with reference to respective positions at the wide-angle end. Therefore, if the position of the third lens unit at the wide-angle end agrees with the position of the third lens unit at the telephoto end, the amount of relative movement of the third lens unit is equal to zero. The same applies to the fourth lens unit. If the lower limit of the conditional formula (13) is disregarded, the interval between the third and fourth lens units on the telephoto side increases, thus leading to upsizing of the variable magnification optical system. By contrast, if the upper limit of the conditional formula (13) is disregarded, the contribution of the fourth lens unit to the variable magnification decreases, and the amount of movement of the movable lens units during variable magnification increases, thereby leading to the upsizing of the variable magnification optical system.

It is further preferable that conditional formula (13a) below be fulfilled.

$$-1.0<M4/M3<1.0 \tag{13a}$$

This conditional formula (13a) defines, within the conditional range defined by the conditional formula (13), a conditional range further preferable out of the above-stated points and other considerations.

In each of the embodiments, the zoom lens system ZL includes refractive lens elements, that is, lens elements that deflect rays incident thereon by refraction (that is, lens elements in which light is deflected at the interface between two media having different refractive indices). Any of those lens elements, however, may be replaced with a lens element of any other type, for example: a diffractive lens element, which deflects rays incident thereon by diffraction; a refractive-diffractive hybrid lens element, which deflects rays incident thereon by the combined effect of refraction and diffraction; or a gradient index lens element, which deflects the rays incident thereon with a refractive index distribution within a medium. A gradient index lens element, however, requires that its refractive index be varied within a medium and thus requires a complicated production process. Thus, using a gradient index lens element leads to higher cost. To avoid this, it is preferable to use lens elements made of a material having a uniform refractive index distribution. The zoom lens system ZL includes, other than lens elements, the aperture stop ST as an optical element, and may further include, as necessary, a beam restricting plate (for example, a flair cutter) or the like for cutting unnecessary light.

EXAMPLES

Hereinafter, practical examples of the zoom lens system embodying the present invention will be presented with reference to their construction data and other data. Examples 1 to 5 presented below are numerical examples corresponding respectively to the first to fifth embodiments described above. Thus, the optical construction diagrams (FIGS. 1 to 5) showing the first to fifth embodiments also show the lens constructions of Examples 1 to 5, respectively.

Tables 1 to 10 show the construction data of Examples 1 to 5. Table 11 shows the values for the conditional formulae, etc., as actually observed in each example. In the basic optical construction shown in Tables 1, 3, 5, 7, and 9 (where i represents the surface number), ri (i=1, 2, 3, . . . ) represents the radius of curvature (in mm) of the i-th surface counted from the object side; di (i=1, 2, 3, . . . ) represents the axial distance (in mm) between the i-th and (i+1)th surfaces counted from the object side; Ni (i=1, 2, 3, . . . ) and vi (i=1, 2, 3, . . . ) represent the refractive index (Nd) for the d-line and the Abbe number (vd), respectively, of the optical material that fills the axial distance di. For each of the variable axial distances, that is, those axial distances di that vary with zooming, three values are given, which are the values observed at the wide-angle end (at the shortest-focal-length position) W, at the middle position (at the middle-focal-length position) M, and at the telephoto end (at the longest-focal-length position) T, respectively. Shown together are the values of the focal length f (in mm) and f-number FNO of the entire system as observed at the just mentioned different focal-length positions W, M, and T.

A surface whose radius of curvature ri is marked with an asterisk (*) is an aspherical surface (a refractive optical surface having an aspherical shape, or a surface that exerts a refractive effect equivalent to that exerted by an aspherical surface, or the like). The surface shape of an aspherical surface is defined by formula (AS) below. Tables 2, 4, 6, 8, and 10 show the aspherical surface data in Examples 1 to 5. Here, it should be noted that the coefficient of any term that does not appear in the tables equals zero, and that, for all the data, E-n stands for "×10$^{-n}$", and E+n stands for "×10$^{+n}$".

$$X(H)=(C0 \cdot H^2)/(1+\sqrt{1-\epsilon \cdot C0^2 \cdot H^2})+\Sigma(Aj \cdot H) \tag{AS}$$

where

X(H) represents the displacement in the direction of the optical axis AX at the height H (relative to the vertex);

H represents the height in a direction perpendicular to the optical axis AX;

C0 represents the paraxial curvature (=1/ri);

$\epsilon$ represents the quadric surface parameter; and

Aj represents the aspherical surface coefficient of the j-th order.

FIGS. 6A to 6I through FIGS. 10A to 10I are aberration diagrams of Examples 1 through 5, respectively, when focused at infinity. Of these aberration diagrams, those with numbers suffixed with A, B, or C show the aberrations observed at (W) representing the wide-angle end, those with numbers suffixed with D, E, or F show the aberrations observed at (M) representing the middle position, and those with numbers suffixed with G, H, or I show the aberrations observed at (T) representing the telephoto end. Of these aberration diagrams, those with numbers suffixed with A, D, or G show spherical aberration and the like, those with numbers suffixed with B, E, or H show astigmatism, and those with numbers suffixed with C, F, or I show distortion. FNO represents the F number, and Y' (in mm) represents the maximum image height (corresponding to the distance from the optical axis AX) on the light-receiving surface SS of the image sensor SR. In each of the spherical aberration diagrams, the solid line d represents the spherical aberration (in mm) observed for the d-line, and the broken line SC represents the deviation (in mm) from the sine condition to be fulfilled. In each of the astigmatism diagrams, the broken line DM and the solid line DS represent the astigmatism (in mm) observed for the d-line on the meridional and sagittal planes, respectively. In each of the distortion diagrams, the solid line represents the distortion (in %) observed for the d-line.

According to the present invention, the variable magnification optical system including four zoom units is configured such that the bending optical element is provided between the second lens unit and third lens unit, and the third lens unit and the like having predetermined optical powers move during the variable magnification. Therefore, this, as shown in FIGS. 11 and 12 to be described below, permits achieving a high performance and high magnification variation while reducing the thickness, height, or width of the camera body. More specifically, aiming at achieving the same effect as achieved by the present invention results in an increase in the thickness of the camera body in the direction of the optical axis in the case of a typical straight-type variable magnification optical system. Aiming at achieving the same effect as achieved by the present invention results in an increase in the height or width of the camera body in the case of a typical bending-type optical system having a bending optical element in the first lens unit. Thus, the present invention permits achieving an image-taking apparatus having a variable magnification optical system which is compact in size and which provides a high performance and high magnification variation. The use of the image-taking apparatus according to the present invention for appliances, such as digital cameras, can contribute to slimming-down, weight saving, downsizing, cost reduction, performance enhancement, function enhancement, and the like of these appliances. Moreover, retracting the bending portion and collapsing the first and second lens units permits achieving a more compact size. Arranging a negative meniscus lens element concave to the object side as the most object-side lens element in the first lens unit permits a reduction in the lens diameter of the most object-side lens element, thus leading to weight saving and downsizing.

TABLE 1

Example 1 (Approx. 6X Zoom)

| Focal Length Position | | (W)~(M)~(T) | | |
|---|---|---|---|---|
| f [mm] | | 7.9~19.3~47.2 | | |
| FNO | | 3.60~3.96~5.60 | | |

| i | ri [mm] | di [mm] | Ni | vi | Symbol |
|---|---|---|---|---|---|
| 1 | −25.287 | 0.730 | 1.98073 | 20.62 | Gr1(+) |
| 2 | −61.123 * | 0.150 | | | |
| 3 | 28.120 | 2.146 | 1.75865 | 51.06 | |
| 4 | −28.190 | 0.500~6.555~12.209 | | | |
| 5 | −78.333 | 0.600 | 1.88300 | 40.79 | Gr2(−) |
| 6 | 8.628 | 1.981 | | | |
| 7 | −14.513 | 0.600 | 1.48749 | 70.44 | |
| 8 | 10.313 | 1.647 | 1.84666 | 23.82 | |
| 9 | −1711.684 | 3.383~0.857~0.200 | | | |
| 10 | ∞ | 8.800 | 1.84666 | 23.78 | PR |
| 11 | ∞ | 11.313~5.367~0.200 | | | |
| 12 | ∞ | 0.600 | | | ST |
| 13 | 8.340 | 3.314 | 1.61727 | 63.77 | Gr3(+) |
| 14 | −76.578 | 0.100 | | | |
| 15 | 10.947 | 2.391 | 1.49700 | 81.61 | |
| 16 | −14.042 | 0.162 | | | |
| 17 | −12.082 | 5.557 | 1.87212 | 33.84 | |
| 18 | 11.342 * | 1.832 | | | |
| 19 | 6.325 | 0.993 | 1.84666 | 23.82 | |
| 20 | 6.776 | 2.366~9.334~16.669 | | | |
| 21 | −7.104 | 1.223 | 1.85388 | 26.04 | Gr4(+) |
| 22 | −9.017 | 0.657 | | | |
| 23 | −46.093 * | 4.830 | 1.53048 | 55.72 | |
| 24 | −6.506 * | 3.491~2.468~0.300 | | | |
| 25 | ∞ | 0.800 | 1.54426 | 69.60 | PT |
| 26 | ∞ | 0.100 | | | |
| 27 | ∞ | 0.800 | 1.51680 | 64.20 | |
| 28 | ∞ | | | | |

TABLE 2

Example 1

Aspherical Surface Data of Surface i (*)

| | Surface 2 | Surface 18 | Surface 23 |
|---|---|---|---|
| ε | 0.10000E+01 | 0.10000E+01 | 0.10000E+01 |
| A4 | 0.24202E−04 | 0.86349E−03 | −0.21103E−03 |
| A6 | 0.69648E−07 | 0.12922E−04 | 0.34564E−04 |
| A8 | −0.92040E−09 | 0.14404E−05 | −0.36578E−06 |
| A10 | 0.19623E−10 | −0.10394E−07 | |

| | Surface 24 |
|---|---|
| ε | 0.10000E+01 |
| A4 | 0.10089E−02 |
| A6 | 0.81065E−05 |
| A8 | 0.51718E−06 |

TABLE 3

Example 2 (Approx. 6X Zoom)

| Focal Length Position | | (W)~(M)~(T) | | |
|---|---|---|---|---|
| f [mm] | | 7.9~19.3~47.2 | | |
| FNO | | 3.60~4.04~5.60 | | |

| i | ri [mm] | di [mm] | Ni | vi | Symbol |
|---|---|---|---|---|---|
| 1 | −21.349 | 0.730 | 1.97665 | 21.99 | Gr1(+) |
| 2 | −60.669 * | 0.150 | | | |
| 3 | 34.140 | 2.459 | 1.81380 | 45.54 | |
| 4 | −23.271 | 0.500~7.062~13.313 | | | |

TABLE 3-continued

Example 2 (Approx. 6X Zoom)

| | | | | | |
|---|---|---|---|---|---|
| 5 | −69.092 | 0.600 | 1.88300 | 40.79 | Gr2(−) |
| 6 | 9.582 | 2.052 | | | |
| 7 | −16.522 | 0.600 | 1.48749 | 70.44 | |
| 8 | 10.960 | 1.641 | 1.84666 | 23.82 | |
| 9 | 213.465 | 5.231~1.750~0.100 | | | |
| 10 | ∞ | 10.000 | | | MR |
| 11 | ∞ | 11.557~5.067~0.200 | | | |
| 12 | ∞ | 0.600 | | | ST |
| 13 | 7.725 | 4.401 | 1.53573 | 67.42 | Gr3(+) |
| 14 | −182.363 | 0.102 | | | |
| 15 | 21.482 | 3.203 | 1.49700 | 81.61 | |
| 16 | −13.529 | 0.199 | | | |
| 17 | −11.093 | 1.565 | 1.86769 | 31.55 | |
| 18 | 47.544 * | 5.500 | | | |
| 19 | 6.395 | 2.011 | 1.84666 | 23.82 | |
| 20 | 5.394 | 2.303~9.967~17.262 | | | |
| 21 | −10.677 | 0.700 | 1.86102 | 28.65 | Gr4(+) |
| 22 | −22.078 | 1.162 | | | |
| 23 | 88.967 * | 6.042 | 1.53048 | 55.72 | |
| 24 | −6.561 * | 3.902~2.728~0.300 | | | |
| 25 | ∞ | 0.800 | 1.54426 | 69.60 | PT |
| 26 | ∞ | 0.100 | | | |
| 27 | ∞ | 0.800 | 1.51680 | 64.20 | |
| 28 | ∞ | | | | |

TABLE 4

Example 2

Aspherical Surface Data of Surface i (*)

| | Surface 2 | Surface 18 | Surface 23 |
|---|---|---|---|
| ε | 0.10000E+01 | 0.10000E+01 | 0.10000E+01 |
| A4 | 0.29786E−04 | 0.46121E−03 | −0.14868E−03 |
| A6 | 0.95591E−07 | 0.74510E−05 | 0.27434E−04 |
| A8 | −0.63260E−09 | 0.23644E−06 | −0.30181E−06 |
| A10 | 0.11066E−10 | 0.67327E−08 | |

| | Surface 24 |
|---|---|
| ε | 0.10000E+01 |
| A4 | 0.10728E−02 |
| A6 | 0.21935E−05 |
| A8 | 0.53490E−06 |

TABLE 5

Example 3 (Approx. 10X Zoom)

| | Focal Length | (W)~(M)~(T) | | | |
|---|---|---|---|---|---|
| | Position | | | | |
| | f [mm] | 7.0~17.4~69.5 | | | |
| | FNO | 3.20~4.20~5.40 | | | |

| i | ri [mm] | di [mm] | Ni | νi | Symbol |
|---|---|---|---|---|---|
| 1 | 33.900 | 0.800 | 1.85186 | 25.39 | Gr1(+) |
| 2 | 20.262 | 0.200 | | | |
| 3 | 20.033 | 3.367 | 1.48814 | 70.76 | |
| 4 | 309.749 | 0.200 | | | |
| 5 | 27.185 | 2.413 | 1.67536 | 48.54 | |
| 6 | 163.505 | 0.500~8.317~20.500 | | | |
| 7 | 71.444 | 0.800 | 1.88300 | 40.80 | Gr2(−) |
| 8 | 6.788 * | 4.321 | | | |
| 9 | −9.209 | 0.700 | 1.71589 | 46.42 | |
| 10 | 27.211 | 0.328 | | | |
| 11 | 24.550 | 1.772 | 1.82631 | 24.06 | |
| 12 | −18.474 | 0.100 | | | |
| 13 | ∞ | 8.500 | 1.84666 | 23.78 | PR |
| 14 | ∞ | 18.910~8.997~0.500 | | | |
| 15 | ∞ | 0.500 | | | ST |
| 16 | 8.158 * | 3.668 | 1.54801 | 44.79 | Gr3(+) |
| 17 | 47.266 | 2.654 | | | |
| 18 | 8.904 | 3.561 | 1.48750 | 70.44 | |
| 19 | −7.424 | 1.549 | 1.84666 | 23.82 | |
| 20 | −3644.581 | 1.388 | | | |
| 21 | −18.273 | 3.564 | 1.86658 | 41.20 | |
| 22 | 18.035 * | 0.733 | | | |
| 23 | 11.675 | 4.000 | 1.79183 | 24.51 | |
| 24 | −468.946 | 1.318~11.825~22.537 | | | |
| 25 | 42.385 * | 2.698 | 1.48750 | 70.00 | Gr4(+) |
| 26 | −11.471 * | 0.470 | | | |
| 27 | −11.287 | 2.683 | 1.85839 | 27.64 | |
| 28 | −20.905 | 4.809~4.215~2.000 | | | |
| 29 | ∞ | 1.357 | 1.51680 | 64.20 | PT |
| 30 | ∞ | | | | |

TABLE 6

Example 3

Aspherical Surface Data of Surface i (*)

| | Surface 8 | Surface 16 | Surface 22 | Surface 25 | Surface 26 |
|---|---|---|---|---|---|
| ε | 0.10000E+01 | 0.10000E+01 | 0.10000E+01 | 0.10000E+01 | 0.10000E+01 |
| A4 | −0.14915E−03 | −0.31500E−04 | 0.44679E−03 | 0.24060E−05 | 0.10447E−03 |
| A6 | −0.88799E−06 | −0.45857E−07 | 0.14089E−05 | −0.50696E−05 | −0.93046E−05 |
| A8 | −0.51360E−07 | | 0.44808E−07 | | 0.97380E−07 |

TABLE 7

Example 4 (Approx. 10X Zoom)

| | Focal Length Position | (W)~(M)~(T) | | | |
|---|---|---|---|---|---|
| | f [mm] | 6.7~16.6~66.5 | | | |
| | FNO | 3.40~4.40~5.50 | | | |

| i | ri [mm] | | di [mm] | Ni | vi | Symbol |
|---|---|---|---|---|---|---|
| 1 | 36.892 | | 0.800 | 1.84672 | 23.84 | Gr1(+) |
| 2 | 20.705 | | 0.200 | | | |
| 3 | 20.539 | | 4.530 | 1.51346 | 65.10 | |
| 4 | 949.118 | | 0.200 | | | |
| 5 | 25.289 | | 2.966 | 1.78550 | 43.61 | |
| 6 | 100.563 | | 0.500~8.767~18.214 | | | |
| 7 | 88.306 | | 0.800 | 1.88300 | 40.80 | Gr2(−) |
| 8 | 7.100 | * | 3.542 | | | |
| 9 | −14.108 | | 0.700 | 1.88287 | 40.80 | |
| 10 | 20.651 | | 0.227 | | | |
| 11 | 16.494 | | 1.891 | 1.84629 | 23.82 | |
| 12 | −44.797 | | 0.100 | | | |
| 13 | ∞ | | 12.000 | | | MR |
| 14 | ∞ | | 18.408~9.061~0.500 | | | |
| 15 | ∞ | | 0.500 | | | ST |
| 16 | 8.105 | * | 2.180 | 1.53952 | 46.93 | Gr3(+) |
| 17 | 40.033 | | 4.342 | | | |
| 18 | 12.120 | | 3.231 | 1.49139 | 67.28 | |
| 19 | −7.116 | | 1.002 | 1.86078 | 28.56 | |
| 20 | −475.547 | | 4.544 | | | |
| 21 | −28.671 | | 1.010 | 1.88300 | 40.80 | |
| 22 | 18.681 | * | 0.510 | | | |
| 23 | 11.705 | | 1.946 | 1.75017 | 25.14 | |
| 24 | −113.142 | | 1.252~10.565~25.296 | | | |
| 25 | 27.324 | * | 3.154 | 1.48750 | 70.44 | Gr4(+) |
| 26 | −8.358 | * | 0.501 | | | |
| 27 | −9.038 | | 1.000 | 1.84666 | 23.82 | |
| 28 | −31.761 | | 8.136~8.169~2.000 | | | |
| 29 | ∞ | | 1.357 | 1.51680 | 64.20 | PT |
| 30 | ∞ | | | | | |

TABLE 8

Example 4

Aspherical Surface Data of Surface i (*)

| | Surface 8 | Surface 16 | Surface 22 | Surface 25 | Surface 26 |
|---|---|---|---|---|---|
| ε | 0.10000E+01 | 0.10000E+01 | 0.10000E+01 | 0.10000E+01 | 0.10000E+01 |
| A4 | −0.81113E−04 | −0.48757E−04 | 0.29102E−03 | 0.20917E−03 | 0.41392E−03 |
| A6 | −0.90475E−06 | −0.18641E−06 | 0.14722E−05 | −0.40512E−05 | −0.10789E−04 |
| A8 | 0.66508E−07 | | 0.44810E−07 | | 0.16930E−06 |

TABLE 9

Example 5 (Approx. 6X Zoom)

| | Focal Length Position | (W)~(M)~(T) | | | |
|---|---|---|---|---|---|
| | f [mm] | 7.9~19.3~47.3 | | | |
| | FNO | 3.60~4.19~5.60 | | | |

| i | ri [mm] | | di [mm] | Ni | vi | Symbol |
|---|---|---|---|---|---|---|
| 1 | −46.785 | | 0.730 | 1.97675 | 21.96 | Gr1(+) |
| 2 | −416.264 | * | 0.329 | | | |
| 3 | 29.121 | | 2.181 | 1.75450 | 51.57 | |
| 4 | −36.107 | | 0.500~7.213~14.499 | | | |
| 5 | −58.897 | | 0.600 | 1.87812 | 37.35 | Gr2(−) |
| 6 | 9.205 | | 2.233 | | | |
| 7 | −16.172 | | 0.610 | 1.48749 | 70.44 | |
| 8 | 10.784 | | 1.582 | 1.84666 | 23.82 | |
| 9 | −476.665 | | 0.200 | | | |
| 10 | ∞ | | 8.800 | 1.84666 | 23.78 | PR |
| 11 | ∞ | | 13.948~6.301~0.200 | | | |
| 12 | ∞ | | 0.600 | | | ST |
| 13 | 8.910 | | 3.196 | 1.56018 | 66.17 | Gr3(+) |
| 14 | −36.307 | | 0.100 | | | |
| 15 | 13.898 | | 2.201 | 1.49700 | 81.61 | |
| 16 | −14.411 | | 0.156 | | | |
| 17 | −12.564 | | 4.112 | 1.75448 | 34.84 | |
| 18 | 12.970 | * | 1.584 | | | |
| 19 | 5.594 | | 1.668 | 1.88300 | 40.79 | |
| 20 | 4.916 | | 2.368~11.420~18.960 | | | |
| 21 | −11.726 | | 0.700 | 1.48749 | 70.44 | Gr4(+) |
| 22 | −21.084 | | 0.580 | | | |
| 23 | 18.809 | * | 6.780 | 1.53048 | 55.72 | |
| 24 | −10.850 | * | 3.144~1.739~0.300 | | | |
| 25 | ∞ | | 0.800 | 1.54426 | 69.60 | PT |
| 26 | ∞ | | 0.100 | | | |
| 27 | ∞ | | 0.800 | 1.51680 | 64.20 | |
| 28 | ∞ | | | | | |

TABLE 10

Example 5

Aspherical Surface Data of Surface i (*)

| | Surface 2 | Surface 18 | Surface 23 |
|---|---|---|---|
| ε | 0.10000E+01 | 0.10000E+01 | 0.10000E+01 |
| A4 | 0.16215E−04 | 0.56630E−03 | 0.81896E−04 |
| A6 | 0.13380E−07 | 0.37264E−05 | 0.76319E−05 |
| A8 | 0.24992E−09 | 0.10910E−05 | −0.46088E−07 |
| A10 | −0.13422E−11 | −0.26044E−07 | |

Example 5

Aspherical Surface Data of Surface i (*)

| | Surface 24 |
|---|---|
| ε | 0.10000E+01 |
| A4 | 0.76822E−03 |
| A6 | 0.66612E−06 |
| A8 | 0.25941E−06 |

TABLE 11

| Conditional Formula | | Example 1 | Example 2 | Example 3 | Example 4 | Example 5 |
|---|---|---|---|---|---|---|
| (1), (1a) | M1 × φW | 1.08 | 0.97 | 2.88 | 2.66 | 1.78 |
| (2), (2a) | φ1/φW | 0.25 | 0.24 | 0.18 | 0.20 | 0.23 |
| (3), (3a) | φ1/φT | 1.52 | 1.46 | 1.84 | 1.98 | 1.36 |
| (4), (4a) | φ1P/φW | 0.42 | 0.45 | 0.16 | 0.16 | 0.36 |
| (5), (5a) | \|φ1N/φW\| | 0.18 | 0.23 | 0.11 | 0.12 | 0.15 |
| (6), (6a) | \|φ2/φW\| | 0.86 | 0.83 | 0.93 | 1.02 | 0.81 |
| (7), (7a) | \|φ2/φT\| | 5.18 | 4.95 | 9.31 | 10.18 | 4.84 |
| (8), (8a) | φ2P/φW | 0.28 | 0.23 | 0.54 | 0.46 | 0.28 |
| (9), (9a) | \|φ2N/φW\| | 0.90 | 0.83 | 0.81 | 0.76 | 0.87 |
| (10), (10a) | M3 × φT | 0.24 | 0.24 | 0.27 | 0.27 | 0.29 |
| (11), (11a) | φ3/φW | 0.62 | 0.53 | 0.42 | 0.35 | 0.58 |
| (12), (12a) | φ3/φT | 3.74 | 3.15 | 4.17 | 3.51 | 3.50 |
| (13), (13a) | M4/M3 | −0.29 | −0.32 | −0.15 | −0.34 | −0.21 |
| | Magnification Variation Ratio | 5.97 | 5.97 | 9.93 | 9.93 | 5.99 |

What is claimed is:

1. A variable magnification optical system for forming an optical image of an object on a light-receiving surface of an image sensor with variable magnification, the variable magnification optical system comprising at least four lens units, namely, from an object side, a first lens unit, a second lens unit, a third lens unit, and a fourth lens unit, at least two of which move to perform the variable magnification;

wherein the first lens unit has at least one negative lens element and at least one positive lens element;

wherein the second lens unit has at least one negative lens element and at least one positive lens element;

wherein a bending optical element for bending an optical axis is provided between the second lens unit and the third lens unit, and wherein conditional formulae (11), (12), and (13) below are fulfilled:

$$0.2 < \phi3/\phi W < 1.0 \tag{11}$$

$$1.5 < \phi3/\phi T < 10.0 \tag{12}$$

$$-2.0 < M4/M3 < 2.0 \tag{13}$$

where $\phi3$ represents an optical power of the third lens unit, $\phi W$ represents an optical power of the entire system at a wide-angle end, $\phi T$ represents an optical power of the entire system at a telephoto end, M3 represents an amount of relative movement of the third lens unit in variable magnification from the wide-angle end to the telephoto end, with movement toward the object side being defined as positive, and M4 represents an amount of relative movement of the fourth lens unit in variable magnification from the wide-angle end to the telephoto end, with movement toward the object side being defined as positive.

2. The variable magnification optical system according to claim 1, wherein conditional formulae (1), (2), and (6) below are fulfilled:

$$0.5 < M1/\phi W < 5.0 \tag{1}$$

$$0.05 < \phi1/\phi W < 0.45 \tag{2}$$

$$0.5 < |\phi2/\phi W| < 3.0 \tag{6}$$

where

M1 represents an amount of relative movement of the first lens unit in variable magnification from the wide-angle end to the telephoto end, with movement toward the object side being defined as positive, $\phi1$ represents an optical power of the first lens unit, and $\phi2$ represents an optical power of the second lens unit.

3. The variable magnification optical system according to claim 1, wherein the first lens unit has on a most object side a negative meniscus lens element concave to the object side.

4. An image-taking apparatus comprising a variable magnification optical system for forming an optical image of an object with variable magnification and an image sensor for converting the optical image into an electrical signal, wherein the variable magnification optical system comprises at least four lens units, namely, from an object side, a first lens unit, a second lens unit, a third lens unit, and a fourth lens unit, at least two of which move to perform the variable magnification, wherein the first lens unit has at least one negative lens element and at least one positive lens element;

wherein the second lens unit has at least one negative lens element and at least one positive lens element;

wherein a bending optical element for bending an optical axis is provided between the second lens unit and the third lens unit, and wherein conditional formulae (11), (12), and (13) below are fulfilled:

$$0.2 < \phi3/\phi W < 1.0 \tag{11}$$

$$1.5 < \phi3/\phi T < 10.0 \tag{12}$$

$$-2.0 < M4/M3 < 2.0 \tag{13}$$

where $\phi3$ represents an optical power of the third lens unit, $\phi W$ represents an optical power of the entire system at a wide-angle end, $\phi T$ represents an optical power of the entire system at a telephoto end, M3 represents an amount of relative movement of the third lens unit in variable magnification from the wide-angle end to the telephoto end, with movement toward the object side being defined as positive, and M4 represents an amount of relative movement of the fourth lens unit in variable magnification from the wide-angle end to the telephoto end, with movement toward the object side being defined as positive.

5. The image-taking apparatus according to claim 4, wherein conditional formulae (1), (2), and (6) below are fulfilled:

$$0.5 < M1/\phi W < 5.0 \tag{1}$$

$$0.05 < \phi1/\phi W < 0.45 \tag{2}$$

$$0.5 < |\phi2/\phi W| < 3.0 \tag{6}$$

where

M1 represents an amount of relative movement of the first lens unit in variable magnification from the wide-angle end to the telephoto end, with movement toward the object side being defined as positive, $\phi1$ represents an optical power of the first lens unit, and $\phi2$ represents an optical power of the second lens unit.

6. The image-taking apparatus according to claim 4, wherein the first lens unit has on a most object side a negative meniscus lens element concave to the object side.

* * * * *